United States Patent
Suzuki

(10) Patent No.: US 11,609,016 B2
(45) Date of Patent: Mar. 21, 2023

(54) AIR CONDITIONING CONTROL SYSTEM AND STORAGE MEDIUM STORING AUTHENTICATION PROGRAM PRODUCT

(71) Applicant: DENSO WAVE INCORPORATED, Aichi-pref. (JP)

(72) Inventor: Akihiro Suzuki, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 126 days.

(21) Appl. No.: 17/350,861

(22) Filed: Jun. 17, 2021

(65) Prior Publication Data

US 2021/0404687 A1 Dec. 30, 2021

(30) Foreign Application Priority Data

Jun. 29, 2020 (JP) .............................. JP2020-111582

(51) Int. Cl.
| | |
|---|---|
| *F24F 11/57* | (2018.01) |
| *F24F 11/49* | (2018.01) |
| *F24F 11/52* | (2018.01) |
| *F24F 11/58* | (2018.01) |
| *F24F 11/63* | (2018.01) |
| *F24F 11/64* | (2018.01) |

(Continued)

(52) U.S. Cl.
CPC .............. *F24F 11/57* (2018.01); *F24F 11/49* (2018.01); *F24F 11/52* (2018.01); *F24F 11/523* (2018.01); *F24F 11/56* (2018.01); *F24F 11/58* (2018.01); *F24F 11/59* (2018.01); *F24F 11/63* (2018.01); *F24F 11/64* (2018.01); *G05B 15/02* (2013.01); *F24F 2110/00* (2018.01)

(58) Field of Classification Search
CPC ............ G05B 15/02; G05B 2219/2614; G08C 17/02; G08C 2201/93; F24F 11/49; F24F 11/50; F24F 11/52; F24F 11/523; F24F 11/56; F24F 11/57; F24F 11/58; F24F 11/59; F24F 11/63; F24F 11/64; F24F 2110/10; H04W 12/06; H04W 12/12
See application file for complete search history.

(56) References Cited

FOREIGN PATENT DOCUMENTS

| JP | 4158500 B2 | * | 10/2008 | |
|---|---|---|---|---|
| JP | 2015-124901 A | | 7/2015 | |
| JP | 2022022592 A | * | 2/2022 | ............... F24F 11/49 |

* cited by examiner

*Primary Examiner* — Crystal J Barnes-Bullock
(74) *Attorney, Agent, or Firm* — Oliff PLC

(57) ABSTRACT

An air conditioning control system includes an air conditioner, an air conditioning control device with a display, and an operation terminal with a camera. First authentication information included in a two-dimensional code displayed in the display in the air conditioning control device is collated with second authentication information acquired from the two-dimensional code imaged by the camera in the operation terminal and included in registration information transmitted from the operation terminal, to determine whether the first authentication information and the second authentication information match with each other. In response to the first authentication information and the second authentication information being determined to match with each other, the operation terminal that has terminal information included in the registration information is successfully authenticated and registered as an operation terminal that is enabled to perform a remote operation of the air conditioning control device.

11 Claims, 18 Drawing Sheets

(51) Int. Cl.
*G05B 15/02* (2006.01)
*F24F 11/59* (2018.01)
*F24F 11/56* (2018.01)
*F24F 11/523* (2018.01)
*F24F 110/00* (2018.01)

FIG. 4

| AUTHENTICATION INFO | | |
|---|---|---|
| TYPES | ITEMS | DATA |
| - | PRODUCT NAME | Air Conditioning Controller |
| UNIQUE INFO | SERIAL NO. | A220012345 |
| | MAC ADDRESS | 5B-12-34-A1-B2-20 |
| VARIABLE INFO | 2-D CODE ISSUE | 14:51:55 2020/02/21 |
| | HEX RANDOM NO | E5A1BC4AB1DD849B |

FIG. 5

| TYPES | | ITEMS | REGISTRATION INFO DATA |
|---|---|---|---|
| AUTHENTICATE INFO (CONTROL DEVICE) | — | PRODUCT NAME | Air Conditioning Controller |
| | UNIQUE INFO | SERIAL NO. | A220012345 |
| | | MAC ADDRESS | 5B-12-34-A1-B2-20 |
| | VARIABLE INFO | 2-D CODE ISSUE | 14:51:55 2020/02/21 |
| | | HEX RANDOM NO | E5A1BC4AB1DD849B |
| TERMINAL INFO (TERMINAL) | — | PRODUCT NAME | Mobile Phone X |
| | | TERMINAL NAME | John's Mobile Phone |
| | UNIQUE INFO | SERIAL NO. | C7PVX6MFJD3F |
| | | MAC ADDRESS | 4C-43-21-B2-A1-20 |
| | | PHONE NO. | 090-1234-5678 |

FIG. 6

| REGISTRATION NO. | TERMINAL INFO ||||||
|---|---|---|---|---|---|
| | TERMINAL NAME | PRODUCT NAME | SERIAL NO. | MAC ADDRESS | PHONE NO. |
| 1 | Michaerl's Mobile Phone | Bphone 11 | A146F3NF45KM | 89-07-4C-D3-30-32 | 070-1111-xxxx |
| 2 | Son's Mobile Phone | APhone 8 | B123CMF56XRE | 02-6B-24-6A-8C-67 | 090-9876-xxxx |
| 3 | John's Moblie Phone | APhone X | C7PVX6MFJD3F | 4C-43-21-B2-A1-20 | 090-1234-xxxx |
| ... | ... | ... | ... | ... | ... |

Current temperture

30°C

Set temperture

Current temperture

30°C

Since there was illegal access by unregistered device, the control data has been rejected. —95

25°C

AIR CONDITIONING CONTROL SYSTEM AND STORAGE MEDIUM STORING AUTHENTICATION PROGRAM PRODUCT

CROSS REFERENCE TO RELATED APPLICATION

The present application is based on Japanese Patent Application No. 2020-111582 filed on Jun. 29, 2020, the disclosure of which is incorporated herein by reference.

TECHNICAL FIELD

The present disclosure relates to an air conditioning control system and a storage medium storing an authentication program product.

BACKGROUND

There is known an air conditioning control system that can remotely control an air conditioner at home from outside via the Internet. Air conditioning is a major factor in determining the comfort of the indoor environment. Therefore, for example, if the temperature and humidity are set differently from the user's intention by a malicious third party, the indoor environment becomes extremely unpleasant for the user. Therefore, in an air conditioning control system capable of remote operation, it is necessary to appropriately prevent unauthorized remote operation by a third party.

Generally, in such an air conditioning control system, a user ID and a password are set in order to prevent unauthorized remote operation. In this case, the user ID is used to associate with the air conditioning control system. Further, the password is used to authenticate whether or not the user is a legitimate user of the air conditioning control system associated with the user ID.

The user inputs the user ID and password when performing remote operation. Then, the air conditioning control system authenticates whether or not the user is a legitimate user who is permitted to perform remote operation based on the user ID and password input by the user. According to this, the user only has to input two data, a user ID and a password, in order to obtain permission for remote operation, and therefore, remote operation can be performed relatively easily.

SUMMARY

According to an example of the present disclosure, an air conditioning control system is provided to include an air conditioner, an air conditioning control device with a display, and an operation terminal with a camera. First authentication information included in a two-dimensional code displayed in the display in the air conditioning control device is collated with second authentication information acquired from the two-dimensional code imaged by the camera in the operation terminal and included in registration information transmitted from the operation terminal, to determine whether the first authentication information and the second authentication information match with each other. In response to the first authentication information and the second authentication information being determined to match with each other, the operation terminal that has terminal information included in the registration information is successfully authenticated and registered as an operation terminal that is enabled to perform a remote operation of the air conditioning control device.

BRIEF DESCRIPTION OF DRAWINGS

The objects, features, and advantages of the present disclosure will become more apparent from the following detailed description made with reference to the accompanying drawings. In the drawings:

FIG. 4 is a diagram showing an example of authentication information for the air conditioning control system according to the first embodiment;

FIG. 5 is a diagram showing an example of registration information for the air conditioning control system according to the first embodiment;

FIG. 6 is a diagram showing an example of a list of permitted terminals for the air conditioning control system according to the first embodiment;

FIG. 21 is a diagram showing an example of display contents displayed on the display unit of the air conditioning control device before performing remote operation using the operation terminal for the air conditioning control system according to the first embodiment;

FIG. 22 is an example of display contents displayed on the display unit of the air conditioning control device when the remote operation information is invalid in cases that remote operation is performed using the operation terminal for the air conditioning control system according to the first embodiment;

DETAILED DESCRIPTION

Hereinafter, an air conditioning control system and program product for an air conditioning control system according to the embodiments will be described with reference to the drawings. In each embodiment, substantially the same elements or components are denoted by the same reference signs and description thereof is omitted.

First Embodiment

Figure 1:
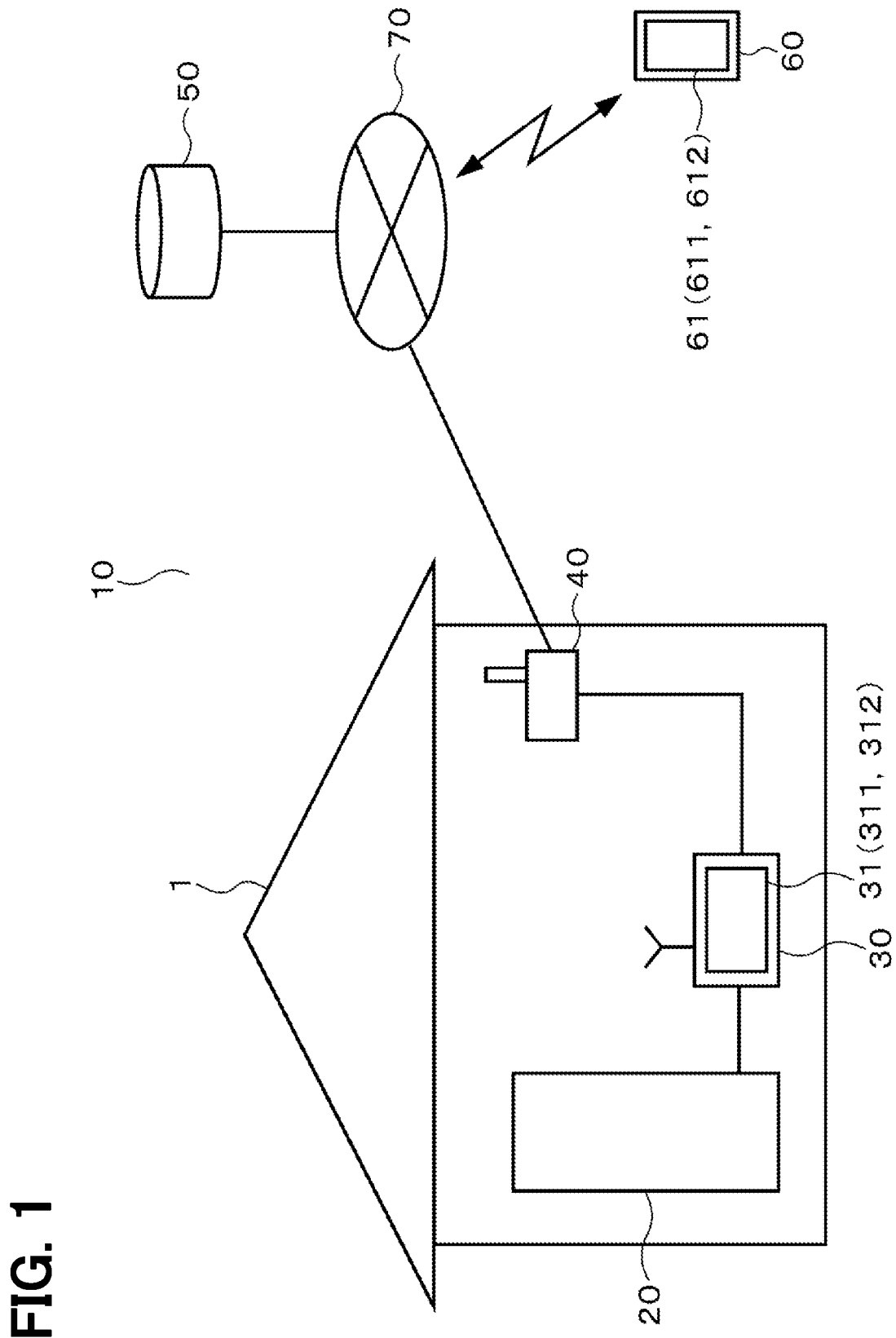
FIG. 1 is a conceptual diagram showing an example of a schematic configuration of an air conditioning control system according to a first embodiment.

A first embodiment will be described with reference to FIGS. 1 to 23. As shown in FIG. 1, an air conditioning control system 10 includes an air conditioner 20, an air conditioning control device 30, an access point 40, a server 50, and an operation terminal 60. The air conditioner 20, the air conditioning control device 30, and the access point 40 are provided in a house 1. The server 50 can be provided inside the house 1 if it is for personal use, or outside the house 1 if it is operated by a company or the like. The operation terminal 60 is configured to be movable between the inside and the outside of the house 1. Hereinafter, first, the basic configuration of devices or the like included in the air conditioning control system 10 will be described.

[Air Conditioner]

The air conditioner 20 has a function of air-conditioning a part or all of the area of the house 1. The air conditioner 20 has, for example, a heat pump type heat exchanger having a compressor, an evaporator, heat exchange fins, etc. (not shown), and has a function of generating warm air and cold air. Although the details of the air conditioner 20 are not shown, the air conditioner 20 is connected to each room of the house 1 by, for example, a pipe. The warm air or cold air generated by the air conditioner 20 is distributed to each room of the house 1 through a pipe (not shown). Further, the air conditioner 20 includes a distribution mechanism for appropriately distributing warm air or cold air to each room. The distribution mechanism is composed of, for example, a damper that opens and closes a pipe path. The amount of warm air or cold air supplied to each room of the house 1 is appropriately adjusted by opening and closing the above-mentioned damper. As a result, each room of the house 1 is air-conditioned to an appropriate temperature.

Although the details of the air conditioner 20 are not shown, the air conditioner 20 includes a thermometer, a hygrometer, an air volume meter, and the like. Then, the air conditioner 20 measures (i) the temperature and humidity of the space in which the air conditioner 20 is installed, and (ii) the air volume of the air discharged from the air conditioner 20. The air conditioner 20 displays the measured temperature, humidity, air volume, and transmits them to the air conditioning control device 30.

[Air Conditioning Control Device]

The air conditioning control device 30 is connected to the air conditioner 20 and has a function of controlling the operation of the air conditioner 20. The air conditioning control device 30 controls a compressor of the air conditioner 20 and the opening and closing of a damper (not shown), thereby air-conditioning each room of the house 1 at an appropriate temperature. In this case, the air conditioner 20 and the air conditioning control device 30 form one air conditioning unit as a central air conditioning system that air-conditions a plurality of rooms. Further, the air conditioning control device 30 is connected to an external telecommunication line 70 such as the Internet or a mobile phone line in the house 1 via the access point 40.

Figure 2:
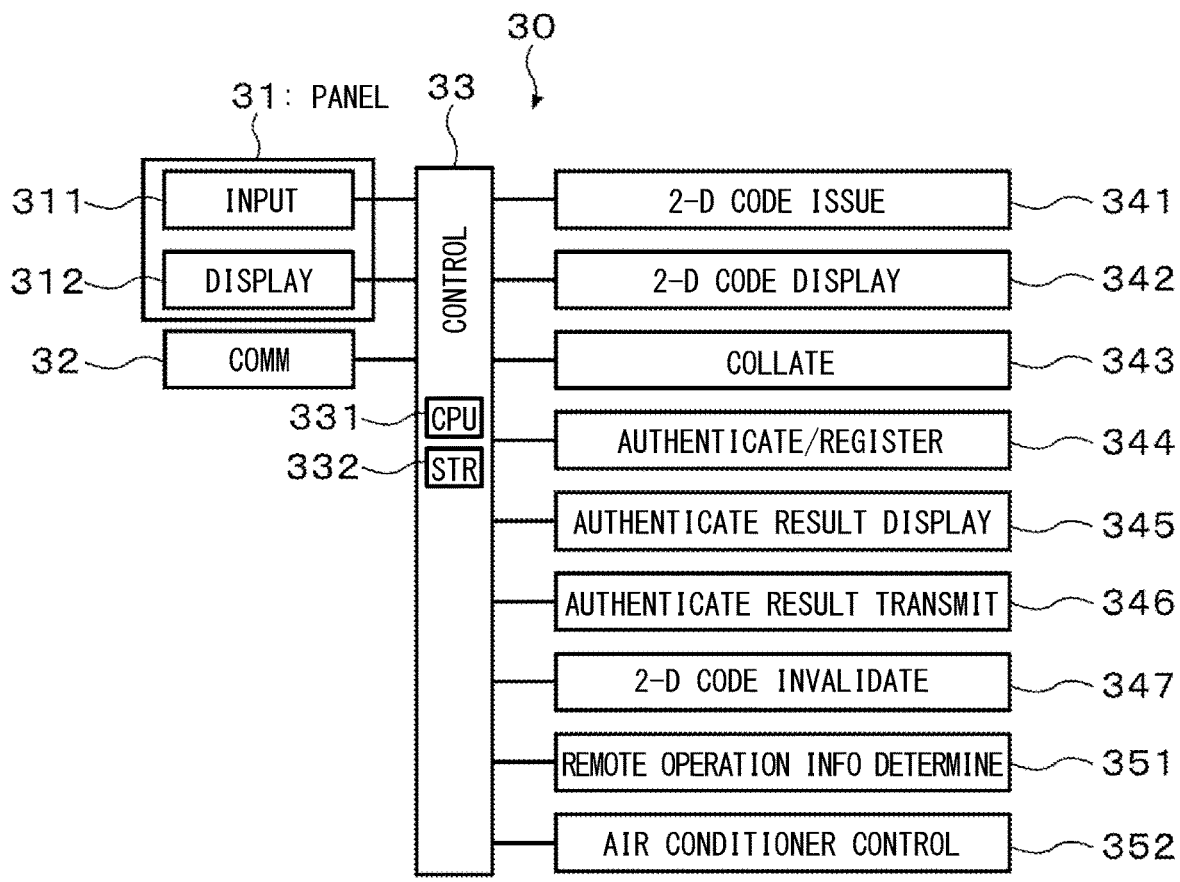
FIG. 2 is a block diagram showing an example of an electrical configuration of an air conditioning control device for the air conditioning control system according to the first embodiment.

As shown in FIG. 2, the air conditioning control device 30 includes an operation panel 31, a communicator unit 32 which may also be referred to as a communicator 32 or a transceiver 32, a controller unit 33 which may also be referred to as a controller 33, and the like. The operation panel 31, the communicator unit 32, and the controller unit 33 may be referred to as an air conditioner side operation panel 31, an air conditioner side communicator unit 32, and an air conditioner side controller unit 33, respectively.

The operation panel 31 includes an input unit 311 and a display unit 312 which may also be referred to as a display 312. The input unit 311 is, for example, a touch panel. The user can input various operations by touching the input unit 311. The display unit 312 is, for example, a liquid crystal display. The controller unit 33 displays various information related to the operation and settings such as the setting contents and the operation states of the air conditioner 20 on the display unit 312. The input unit 311 and the display unit 312 are provided so as to overlap each other, thereby functioning as a touch panel display.

The communicator unit 32 has a function of communicating with an external server 50 or an operation terminal 60 via, for example, an access point 40 and a telecommunication line 70 such as the Internet. The communicator unit 32 has a function of connecting to an access point 40 by a LAN (Local Area Network) for example. In this case, the communicator unit 32 may connect to the access point 40 by either a wireless LAN conforming to the Wi-Fi (Wireless Fidelity) standard or a wired LAN.

The controller unit 33 mainly includes a microcomputer having a CPU 331, and a storage area 332 such as a ROM, a RAM, and a rewritable flash memory. The storage area 332 stores a program for the air conditioning control system, for example, an authentication program between the air conditioning control device and the operation terminal, and a control program for the air conditioner.

[Access Point]

The access point 40 is, for example, a wireless LAN router generally distributed in the market, a so-called Wi-Fi router, and has a LAN connection function and a router function. That is, the access point 40 serves as a relay point for data transfer between the air conditioning control device 30 and the operation terminal 60 as a LAN connection function, and connects the air conditioning control device 30 and the operation terminal 60 in a communicable manner. Further, as a router function, the access point 40 connects the air conditioning control device 30 with the telecommunication line 70, and the telecommunication line 70 with the operation terminal 60 so as to be communicable. In the present embodiment, the access point 40 is provided separately from the air conditioning control device 30, but can also be integrally configured with the air conditioning control device 30. When the communicator unit 32 has a function of connecting to an external telecommunication line 70 by a mobile phone line without using a LAN, the air conditioning control system 10 does not have to include the access point 40.

[Server]

The server 50 can be configured by, for example, an external server provided on the Internet, and is referred to as a database server, a Web server, a cloud server, or the like. The server 50 records information necessary for managing the air conditioning control device 30 and the operation terminal 60, for example, the serial number and MAC address of the air conditioning control device 30 in association with the ID and password set by the user. In this case, the server 50 functions as a so-called management server. Further, the server 50 stores a program, that is, application software, necessary for remotely controlling the air conditioner 20 from the operation terminal 60 via the air conditioning control device 30. In this case, the server 50 functions as a so-called application storage server.

[Operation Terminal]

The operation terminal 60 is an operation terminal that is not attached to the air conditioning control device 30, for example, a multifunctional mobile terminal such as a so-called smartphone or tablet PC that the user holds in advance. The operation terminal 60 is capable of wireless communication with other devices. For example, when the operation terminal 60 is within the communication area of the access point 40, the operation terminal 60 is communicably connected to the air conditioning control device 30 via the access point 40. Further, for example, there is a case that the operation terminal 60 is outside the communication area of the access point 40, that is, outside the house 1. In such a case, the operation terminal 60 is communicably connected to the air conditioning control device 30 via a telecommunication line 70 such as the Internet or a mobile phone line and an access point 40.

Figure 3:
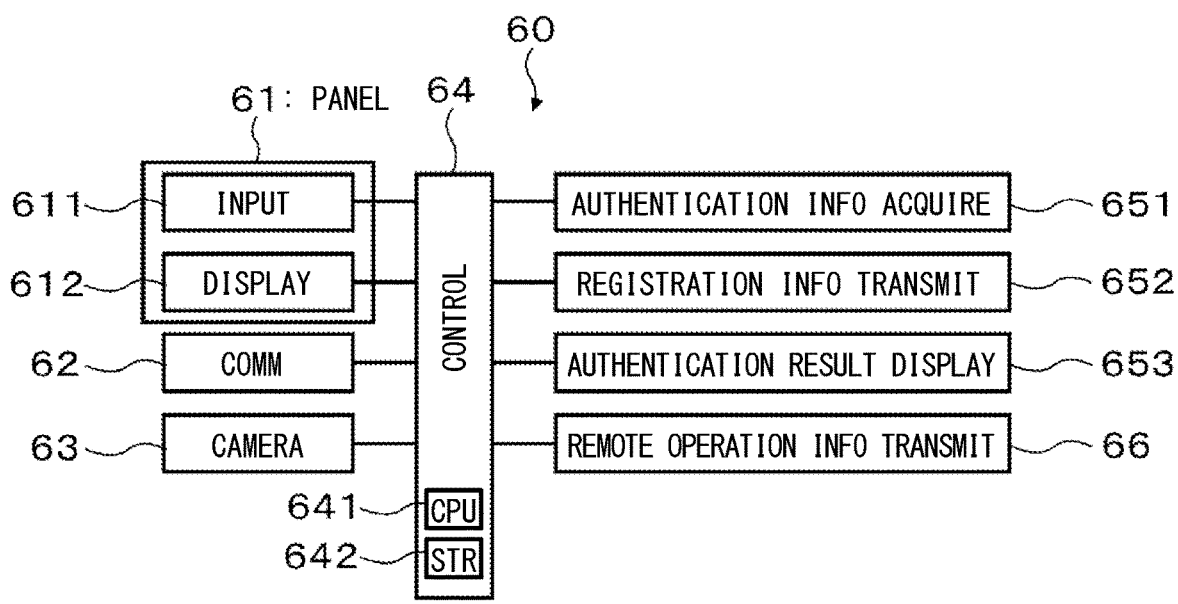
FIG. 3 is a block diagram showing an example of an electrical configuration of an operation terminal for the air conditioning control system according to the first embodiment.

As shown in FIG. 3, the operation terminal 60 includes an operation panel 61, a communicator unit 62 which may also be referred to as a communicator 62 or a transceiver 62, a camera 63, a controller unit 64 which may also be referred to as a controller 64, and the like. The operation panel 61, the communicator unit 62, and the controller unit 64 included in the operation terminal 60 may be referred to as an operation terminal side operation panel 61, an operation terminal side communicator unit 62, and an operation terminal side controller unit 64, respectively.

The operation panel 61 includes an input unit 611 and a display unit 612 which may also be referred to as a display 612. The input unit 611 is, for example, a touch panel. The user can input various operations by touching the input unit 611. The display unit 612 is, for example, a liquid crystal display. The controller unit 64 displays various information related to the operation and settings such as the setting contents and the operation status of the air conditioner 20 on the display unit 612. The input unit 611 and the display unit 612 are provided so as to overlap each other, thereby functioning as a touch panel display.

The communicator unit 62 has a function of communicably connecting to the air conditioning control device 30 via, for example, a telecommunication line 70 such as a mobile phone line or the Internet. The camera 63 can take a moving image or a still image, and has a function of imaging (i.e., capturing an image of) a two-dimensional code such as a QR code (registered trademark). The controller unit 64 mainly includes a microcomputer having a CPU 641 and a storage area 642 such as, a ROM, a RAM, and a rewritable flash memory.

[Details of Each Process in Authentication Registration of Operation Terminal]

Next, processing for authenticating and registering the operation terminal 60 so as to permit remote operation of the air conditioning control device 30 will be described mainly with reference to FIGS. 2 to 6. The air conditioner side controller unit 33 executes an authentication program between the device and the operation terminal in the CPU 331 when the operation terminal 60 that is permitted to remotely control is authenticated and registered. As a result, as shown in FIG. 2, the followings are virtually realized by software: the two-dimensional code issuance processing unit 341, the two-dimensional code display processing unit 342, the collation processing unit 343, the authentication registration processing unit 344, the authentication result display processing unit 345, and the authentication result transmission processing unit 346, and the two-dimensional code invalidation processing unit 347.

That is, each of the processing units 341 to 347 of the air conditioning control device 30 is realized by software, that is, by the CPU 331 executing a computer program stored in the non-transitory tangible storage medium such as the storage area 332 described above. In addition, at least a part of each processing unit 341 to 347 may be realized by hardware. For example, the two-dimensional code issuance processing unit 341, the two-dimensional code display processing unit 342, the collation processing unit 343, then authentication registration processing unit 344, the authentication result display processing unit 345, the authentication result transmission processing unit 346, and the two-dimensional code invalidation processing unit 347 may be realized in terms of hardware as an integrated circuit integrated with the air conditioner side controller unit 33.

Further, the controller unit 64 of the operation terminal 60 installs and starts the program downloaded from the server 50 to the storage area 642 when performing authentication registration as the operation terminal 60 that is permitted to perform remote operation. Then, the controller unit 64 executes an authentication program between the device and the operation terminal in the CPU 641. As a result, as shown in FIG. 3, the authentication information acquisition processing unit 651, the registration information transmission processing unit 652, the authentication result display processing unit 653, and the like are virtually realized by software.

That is, each of the processing units 651 to 653 of the operation terminal 60 is realized by software, that is, by the CPU 641 executing the computer program stored in the non-transitory tangible storage medium such as the storage area 642 described above to execute the processing corresponding to the computer program. In addition, at least a part of each processing unit 651 to 653 may be realized by hardware. For example, the authentication information acquisition processing unit 651, the registration information transmission processing unit 652, and the authentication result display processing unit 653 may be realized in hardware as, for example, an integrated circuit integrated with the controller unit 64.

Next, the details of the processing units 341 to 347 of the air conditioning control device 30 and the processing units 651 to 653 of the operation terminal 60 will be described. The two-dimensional code issuance processing unit 341 of the air conditioning control device 30 can execute the two-dimensional code issuance process. The two-dimensional code issuance process includes a process of issuing a two-dimensional code including authentication information unique to the air conditioning control device 30. In the present embodiment, the term "unique to the air conditioning control device 30" means that one air conditioning control device 30 can be identified from a plurality of air conditioning control devices 30 of the same model or the same type. In the present embodiment, the authentication information authenticates that the user of the operation terminal 60 and the user of the air conditioning control device 30 are the same, and is used for a process of permitting remote operation by the operation terminal 60 held by the user and registering it in the air conditioning control device 30 or the server 50.

Further, the two-dimensional code issuance process includes a process of changing the content of the authentication information each time the two-dimensional code is issued. In this case, as shown in FIG. 4, the authentication information includes unique information unique to the air conditioning control device 30, and variable information whose contents vary each time a two-dimensional code is issued. The unique information includes one or both of (i) the serial number (i.e., the individual identification number) and (ii) the MAC address of the air conditioning control device 30. The MAC address is a unique identification number assigned to a network device such as the communicator unit 32, and is represented by a hexadecimal number. In the present embodiment, the unique information includes both the serial number and the MAC address of the air conditioning control device 30.

The variation information includes one or both of (i) information that varies according to the timing of issuing each two-dimensional code, or (ii) information whose content randomly varies each time the two-dimensional code is issued. The information whose content varies according to the timing of issuing the two-dimensional code is, for example, the issue date and the issue time of the two-dimensional code. The information whose content varies randomly is, for example, a random number generated when a two-dimensional code is issued, or a combination thereof. In the present embodiment, the variation information includes the issue date and time of the two-dimensional code and a random number of 10 digits or more, in this case 16 digits, in hexadecimal. In this case, the issue date and time of the two-dimensional code includes up to units of seconds. Further, in the present embodiment, the hexadecimal random number does not have to be an exact random number. For example, a pseudo-random number obtained by inputting the issuance date and time of the two-dimensional code, the number of issuances, etc. into the pseudo-random number generator may be used. In addition, the authentication information includes the product name as information that does not belong to either the unique information or the variable information.

Figure 11:
FIG. 11 is a diagram showing an example of a state in which a two-dimensional code is displayed on the display unit of the air conditioning control device when authenticating an operation terminal with respect to the air conditioning control system according to the first embodiment.

The two-dimensional code display processing unit 342 included in the air conditioning control device 30 can execute the two-dimensional code display process. The two-dimensional code display process includes, for example, as shown in FIG. 11, a process of displaying the two-dimensional code QR issued by the two-dimensional code issuance process on the display unit 312 included in the air conditioning control device 30. The two-dimensional code displayed on the display unit 312 by executing the two-dimensional code display process is a two-dimensional code of the above-mentioned authentication information shown in FIG. 4.

The authentication information acquisition processing unit 651 of the operation terminal 60 can execute the authentication information acquisition process. The authentication information acquisition process includes a process of acquiring the authentication information shown in FIG. 4 from the two-dimensional code imaged by the camera 63 of the operation terminal 60. In this case, the authentication information acquisition process acquires the authentication information only from the two-dimensional code imaged by the camera 63 built in the operation terminal 60, for example. In contrast, the authentication information acquisition process may include a process of causing an error when receiving via e-mail a two-dimensional code obtained by a means other than the camera 63 built in the operation terminal 60 (e.g., a two-dimensional code imaged by another operation terminal), without acquiring authentication information. According to this, the identity is ensured between (i) the operation terminal that captures an image of the two-dimensional code and (ii) the operation terminal for which authentication registration is to be performed, so that security can be improved.

The registration information transmission processing unit 652 of the operation terminal 60 can execute the registration information transmission process. As shown in FIG. 5, the registration information transmission process includes a process of transmitting, to the air conditioning control device 30, the registration information obtained by adding terminal information including information unique to the operation terminal 60 to the authentication information acquired by the authentication information acquisition process. That is, the registration information includes (i) the authentication information acquired from the two-dimensional code and (ii) the terminal information added by the operation terminal 60. The terminal information is information that can identify one operation terminal from a plurality of operation terminals. The unique information unique to the operation terminal 60 is information that only the operation terminal 60 has. For example, the serial number, MAC address, telephone number, etc. of the operation terminal 60, or a combination thereof. Further, in the present embodiment, the terminal information includes the product name and the terminal name as information that does not belong to the unique information. The terminal name can be freely set by the user of the operation terminal 60, for example.

The collation processing unit 343 included in the air conditioning control device 30 can execute the collation process. The collation process includes a process to collate, with each other, (i) the authentication information included in the two-dimensional code QR shown in FIG. 11 issued by the two-dimensional code issuance process and (ii) the authentication information included in the registration information transmitted from the operation terminal 60 by the registration information transmission process. The collation process includes a process of outputting a result of matching or not matching between the authentication information included in the two-dimensional code and the authentication information included in the registration information transmitted from the operation terminal 60.

The authentication registration processing unit 344 included in the air conditioning control device 30 can execute the authentication registration process. Note that "authentication" or "authenticate" may also be referred to as "verification" or "verify", respectively. The authentication registration process includes a process of authenticating and registering an operation terminal 60 having terminal information included in the registration information as an operation terminal capable of remote operation of the air conditioner 20, in cases where (i) the authentication information included in the two-dimensional code issued by the two-dimensional code issuance process by the collation process executed by the collation processing unit 343 matches with (ii) the authentication information included in the registration information transmitted from the operation terminal 60 by the registration information transmission process.

That is, suppose a case where the same information as the authentication information included in the two-dimensional code issued by the self in the two-dimensional code issuance process is included in the registration information transmitted from the operation terminal 60. In such a case, the authentication registration processing unit 344 determines that the authentication of the operation terminal 60 has succeeded. Then, the authentication registration processing unit 344 determines that the operation terminal 60 that has transmitted the registration information may be an appropriate one (i.e., one that is permitted to perform remote operation). On the other hand, suppose a case where the same information as the authentication information included in the two-dimensional code issued by itself in the two-dimensional code issuance process is not included in the registration information transmitted from the operation terminal 60. In such a case, the authentication registration processing unit 344 determined that the authentication of the operation terminal 60 has failed. Then, the authentication registration processing unit 344 determines that the operation terminal 60 that has transmitted the registration information is an illegal one (i.e., one that is not permitted to perform remote operation). In the present embodiment, "illegal remote operation" means remote operation from an unauthorized one regardless of whether it is in good faith or malicious intent.

Further, the authentication registration process includes a process of additionally registering the terminal information of the operation terminal for which remote operation is permitted to the permitted terminal list. The permitted terminal list is, for example, as shown in FIG. 6, in which terminal information is associated with, for example, a registration number, and is stored in the storage area 332.

Figure 14:
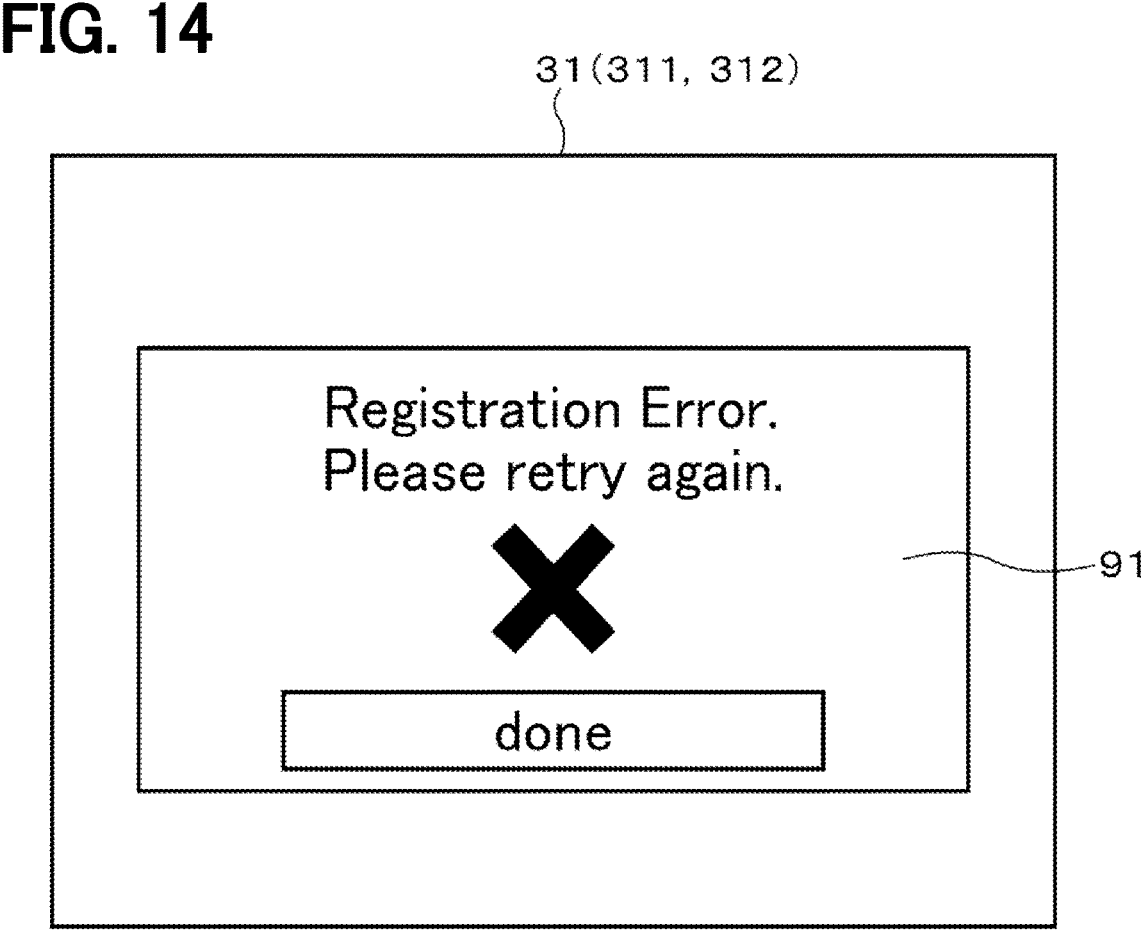
FIG. 14 is a diagram showing an example of a state in which information indicating that authentication has failed is displayed on the display unit of the air conditioning control device when authenticating the operation terminal of the air conditioning control system according to the first embodiment.
Figure 16:
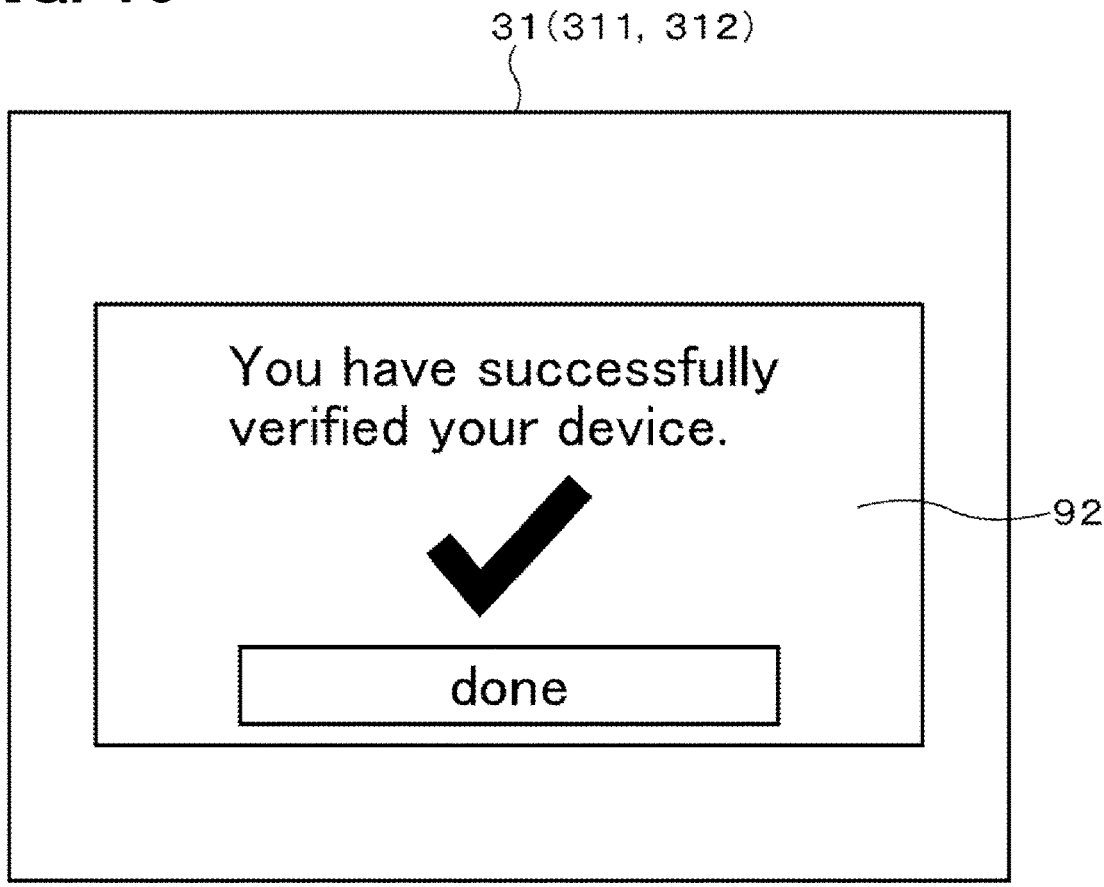
FIG. 16 is a diagram showing an example of a state in which information indicating that the authentication has succeeded is displayed on the display unit of the air conditioning control device when the operation terminal is authenticated for the air conditioning control system according to the first embodiment.

The authentication result display processing unit 345 included in the air conditioning control device 30 can execute the authentication result display process. The authentication result display process executed by the authentication result display processing unit 345 of the air conditioning control device 30 includes a process of displaying information on the authentication result in the authentication registration process, that is, a process of displaying the success or failure of the authentication on the display unit 312 of the air conditioning control device 30. For example, when the authentication fails, the authentication result display processing unit 345 displays information indicating that the authentication has failed on the display unit 312, as shown in FIG. 14. Further, the authentication result display processing unit 345 displays, for example, when the authentication is successful, information indicating that the authentication is successful is displayed on the display unit 312 as shown in FIG. 16.

The authentication result transmission processing unit 346 of the air conditioning control device 30 can execute the authentication result transmission process. The authentication result transmission process includes a process of transmitting the success or failure of the authentication registration process to the operation terminal 60. When the authentication has succeeded in the authentication registration process, the authentication result transmission processing unit 346 transmits information to the effect that the authentication has succeeded to the operation terminal 60 that has transmitted the registration information. On the other hand, when the authentication has failed in the authentication registration process, the authentication result transmission processing unit 346 transmits information to the effect that the authentication has failed to the operation terminal 60 that has transmitted the registration information.

Figure 15:
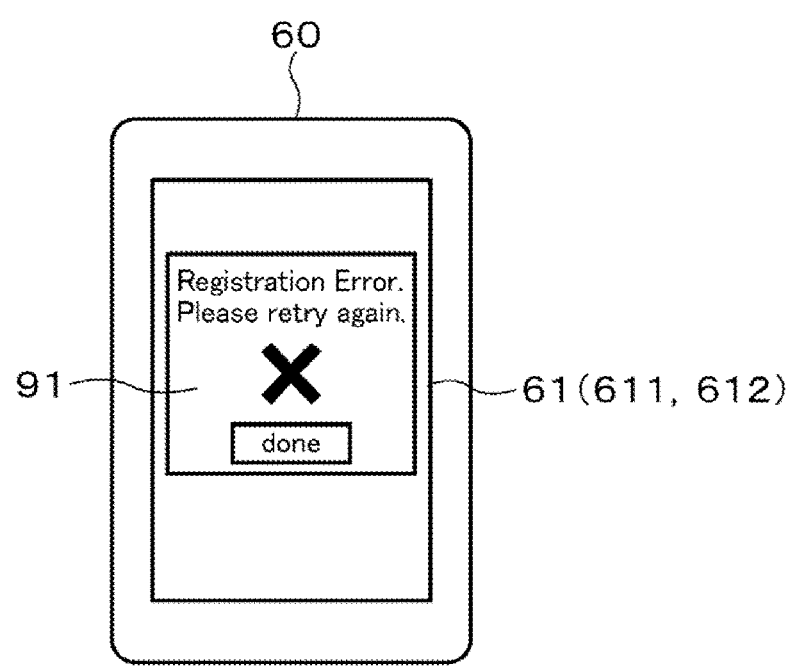
FIG. 15 is a diagram showing an example of a state in which information indicating that authentication has failed is displayed on the display unit of the operation terminal when the operation terminal is authenticated with respect to the air conditioning control system according to the first embodiment.
Figure 17:
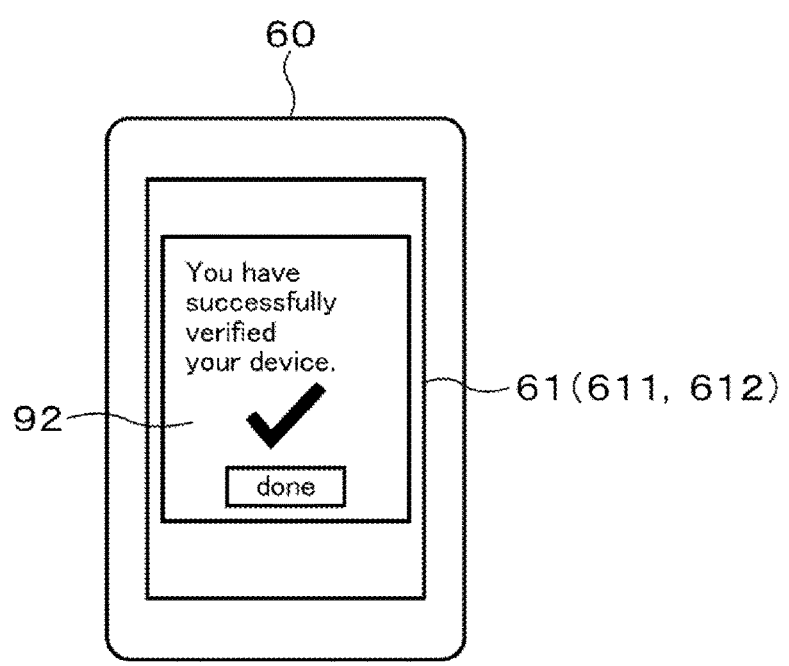
FIG. 17 is a diagram showing an example of a state in which information indicating the authentication has succeeded is displayed on the display unit of the operation terminal when the operation terminal is authenticated with respect to the air conditioning control system according to the first embodiment.

The authentication result display processing unit 653 included in the operation terminal 60 can execute the authentication result display processing in the same manner as the authentication result display processing unit 345 included in the air conditioning control device 30. The authentication result display process executed by the authentication result display processing unit 653 of the operation terminal 60 includes a process of displaying the information regarding the authentication result received from the air conditioning control device 30, that is, a process of displaying the success or failure of the authentication on the display unit 612 of the operation terminal 60. In the present embodiment, when the authentication result display processing unit 653 receives information indicating that the authentication has failed from the air conditioning control device 30, the information 91 indicating that the authentication has failed is displayed on the display unit 612, as shown in FIG. 15. Further, when the authentication result display processing unit 653 receives information indicating that the authentication has succeeded from the air conditioning control device 30, the information 92 indicating that the authentication has succeeded is displayed on the display unit 612, as shown in FIG. 17.

The two-dimensional code invalidation processing unit 347 included in the air conditioning control device 30 can execute the two-dimensional code invalidation process. The two-dimensional code invalidation process includes a process of invalidating the two-dimensional code used in the authentication registration process when the authentication is successful and the terminal information is registered by the authentication registration process. The invalidation of the two-dimensional code means that the authentication registration of the operation terminal 60 cannot be performed using the two-dimensional code that has been invalidated. Therefore, one two-dimensional code can be authenticated and registered only for one operation terminal 60. That is, it is not possible to authenticate and register a plurality of operation terminals 60 with one two-dimensional code.

Further, the two-dimensional code invalidation process includes a process of invalidating the two-dimensional code when a predetermined period of time has elapsed since the two-dimensional code was displayed on the display unit 312. In this case, the predetermined period of time is not particularly limited to a specific value, but is preferably from several tens of seconds to several minutes at the longest, for example. As a result, if the authentication registration of the operation terminal 60 is not successful for a predetermined period of time since the two-dimensional code was issued and displayed on the display unit 312, the two-dimensional code is invalidated.

In this case, the two-dimensional code invalidation process further includes a process of erasing the invalidated two-dimensional code, that is, a process of erasing the display of the two-dimensional code currently displayed on the display unit 312 when the two-dimensional code is invalidated. As a result, it is possible to prevent the user from performing authentication registration of the operation terminal 60 using the invalidated two-dimensional code.

[Authentication Registration of Operating Terminal]

Next, with reference to FIGS. 7 to 18, the sequence of processing executed by the air conditioning control device 30 and the operation terminal 60 will be described. This is executed when authenticating and registering the operation terminal 60 that is permitted to perform remote operation of the air conditioning control device 30, that is, when newly registering the operation terminal 60 that is permitted to perform remote operation of the air conditioning control device 30.

The following will be described on the premise that (i) the main body of each process executed by each of the processing units 341 to 347 of the air conditioning control device 30 is the air conditioner side controller unit 33, and (ii) the main body of each process executed by each of the processing units 651 to 653 of the operation terminal 60 is the operation terminal side controller unit 64.

[Control Sequence of Air Conditioning Control Device]

Figure 10:
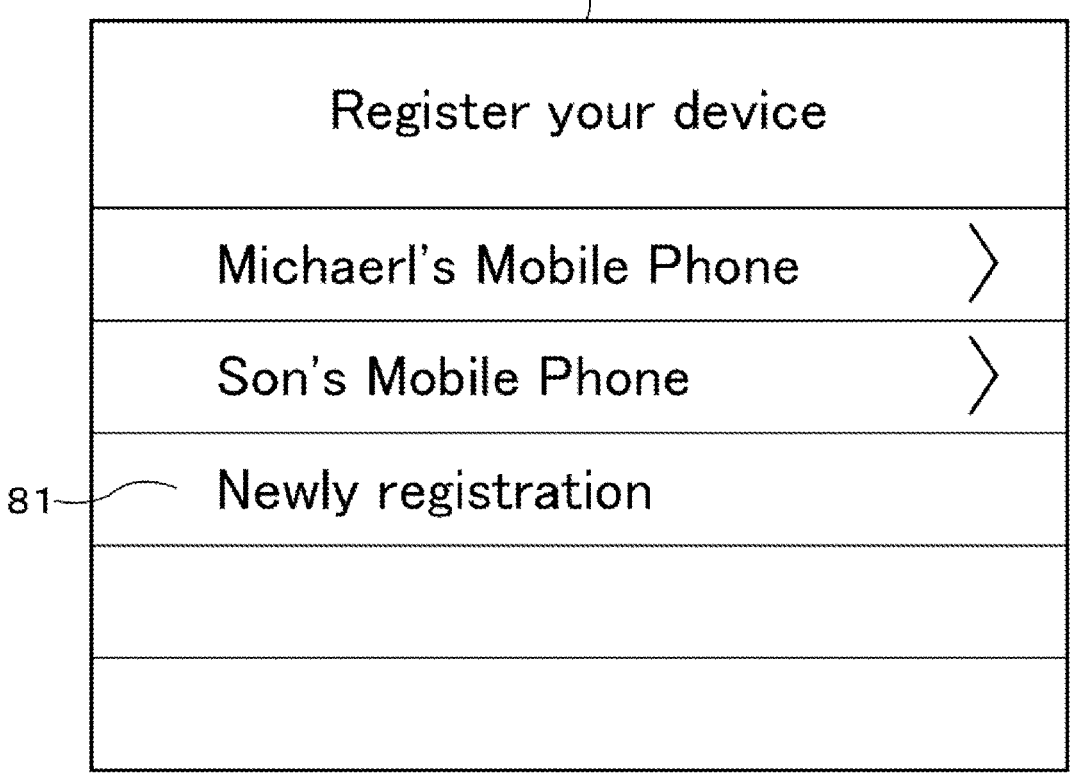
FIG. 10 is a diagram showing an example of a state in which a list of registered terminals is displayed on the display unit of the air conditioning control device before starting authentication of the operating terminals for the air conditioning control system according to the first embodiment.

First, the control sequence executed by the air conditioning control device 30 regarding the authentication registration of the operation terminal 60 will be described. As shown in FIG. 10, the air conditioner side controller unit 33 displays a list of currently registered operation terminals 60 on the display unit 312 together with the new registration button 81 as an initial screen when performing authentication registration. The user touch-operates the new registration button 81 of the display unit 312 to start a series of controls for authenticating and registering the operation terminal 60 (start in FIG. 7).

Figure 7:
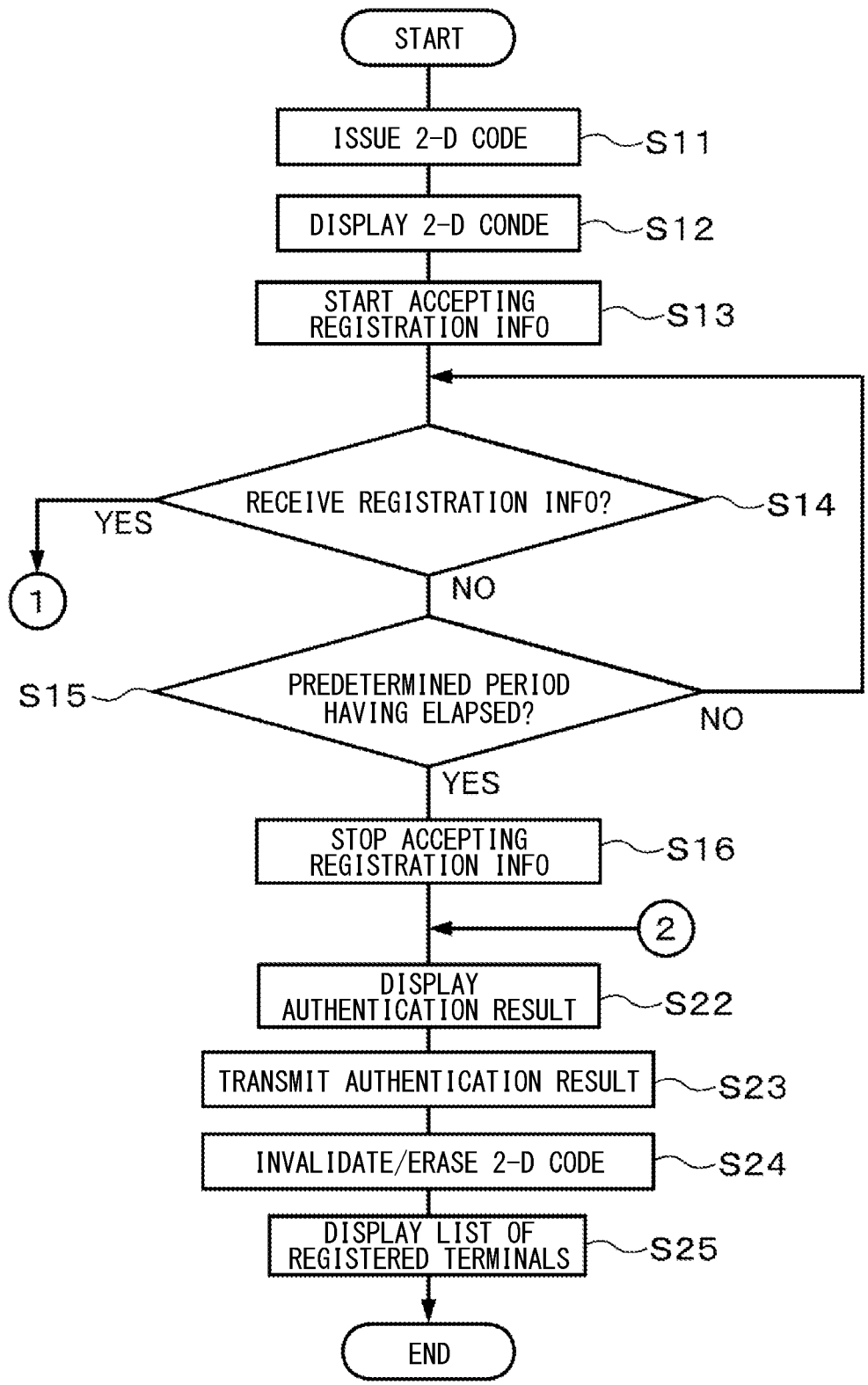
FIG. 7 is a flowchart (No. 1) showing an example of control executed by the air conditioning control device when authenticating an operation terminal for the air conditioning control system according to the first embodiment.

The air conditioner side controller unit 33 first executes the two-dimensional code issuance process in step S11 of FIG. 7, and issues the two-dimensional code including the authentication information of the air conditioning control device 30 shown in FIG. 4. Next, the air conditioner side controller unit 33 executes the two-dimensional code display process in step S12 of FIG. 7, and causes the display unit 312 of the air conditioning control device 30 to display the two-dimensional code QR issued in step S11. Then, the air conditioner side controller unit 33 shifts the process to step S13 and starts accepting registration information transmitted from the operation terminal 60.

Next, the air conditioner side controller unit 33 shifts the process to step S14, and determines whether or not the registration information transmitted from the operation terminal 60 is received. When the registration information is not received from the operation terminal 60 (NO in step S14), the air conditioner side controller unit 33 shifts the process to step S15. In step S15, the air conditioner side controller unit 33 determines whether or not a predetermined period of time has elapsed since the two-dimensional code was displayed on the display unit 312. If a predetermined period of time has not elapsed since the two-dimensional code was displayed on the display unit 312 (NO in step S15), the air conditioner side controller unit 33 returns the process to step S14. Then, the air conditioner side controller unit 33 repeats steps S14 and S15 until the registration information is received (YES in step S14) or a predetermined period of time elapses (YES in step S15).

When a predetermined period of time has elapsed since the two-dimensional code was displayed on the display unit 312 (YES in step S15), the air conditioner side controller unit 33 shifts the process to step S16. In step S16, the air conditioner side controller unit 33 ends the acceptance of registration information from the operation terminal 60. After that, even if the registration information is transmitted from the operation terminal 60, the air conditioner side controller unit 33 refuses to receive the registration information. Then, the air conditioner side controller unit 33 shifts the process to step S22.

Figure 8:
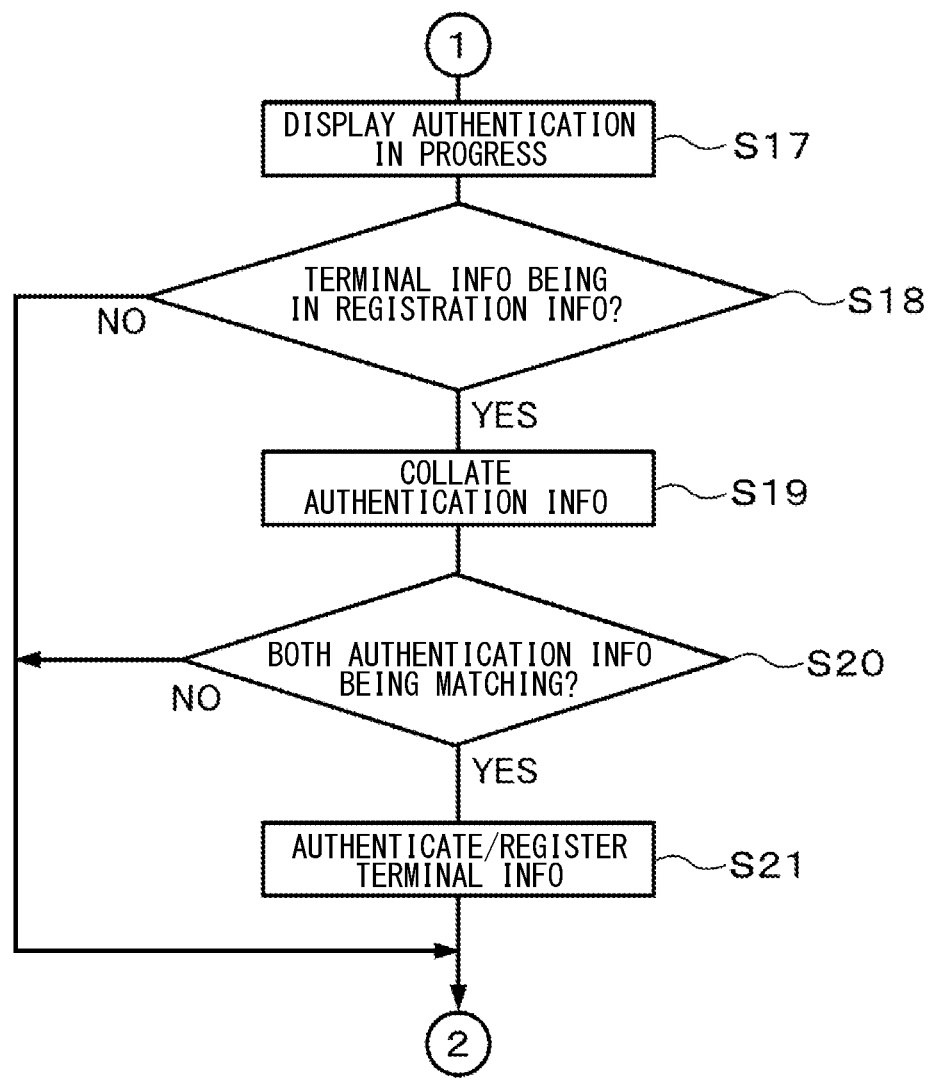
FIG. 8 is a flowchart (No. 2) showing an example of control executed by the air conditioning control device when authenticating an operation terminal for the air conditioning control system according to the first embodiment.
Figure 12:
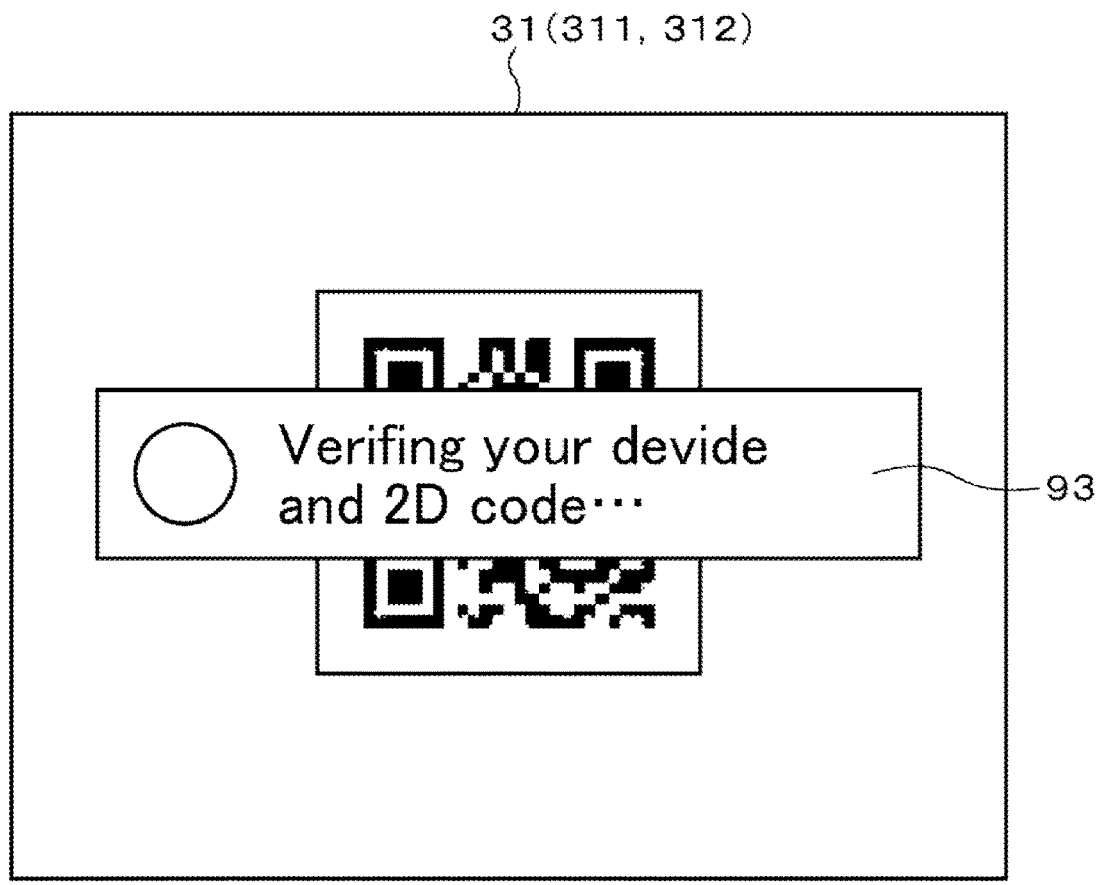
FIG. 12 is a diagram showing an example of a state in which information indicating that authentication is currently being performed is displayed on the display unit of the air conditioning control device when the operation terminal is authenticated for the air conditioning control system according to the first embodiment.

Further, when the air conditioner side controller unit 33 receives the registration information from the operation terminal 60 (YES in step S14), the process is shifted to step S17 shown in FIG. 8. In step S17, the air conditioner side controller unit 33 causes the display unit 312 to display information 93 indicating that the operation terminal 60 is currently being authenticated (i.e., authentication in progress) as shown in FIG. 12. The information 93 indicating that the authentication is in progress continues to be displayed on the display unit 312 until the result of the authentication registration is obtained.

Next, in step S18 of FIG. 8, the air conditioner side controller unit 33 determines whether or not the received registration information includes the terminal information. If the received registration information does not include the terminal information (NO in step S18), the air conditioner side controller unit 33 determines that an error has occurred, that is, that the authentication registration has failed, and shifts the process to step S22 of FIG. 7. On the other hand, when the received registration information includes the terminal information (YES in step S18), the air conditioner side controller unit 33 shifts the process to step S19.

In step S19, the air conditioner side controller unit 33 executes the collation process to collate the authentication information included in the two-dimensional code currently being issued with the authentication information included in the registration information received from the operation terminal 60. When the authentication information included in the currently issued two-dimensional code and the authentication information included in the registration information received from the operation terminal 60 do not match (NO in step S20), the air conditioner side controller unit 33 determines that an error has occurred, that is, that the authentication has failed, and shifts the process to step S22 of FIG. 7. On the other hand, when the authentication information included in the currently issued two-dimensional code and the authentication information included in the registration information received from the operation terminal 60 match (YES in step S20), the air conditioner side controller unit 33 determines that the authentication has succeeded, and shifts the process to step S21.

In step S21, the air conditioner side controller unit 33 executes the authentication registration process, to authenticate the terminal information included in the registration information and register it in the storage area 332. As a result, the operation terminal 60 having the terminal information is added to the permitted terminal list, which is a list of terminals for which remote operation of the air conditioning control device 30 is permitted. As a result, the user can remotely operate the air conditioning control device 30 by using the operation terminal 60 having the terminal information. After that, the air conditioner side controller unit 33 shifts the process to step S22 of FIG. 7.

The air conditioner side controller unit 33 executes the authentication result display process in step S22. At this time, suppose a case where the air conditioner side controller unit 33 fails in the authentication registration, that is, the authentication registration process in step S21 of FIG. 8 is not executed. In such a case, as shown in FIG. 14, the so-called error information 91 indicating that the authentication registration has failed as a result of the authentication registration is displayed on the display unit 312. Further, suppose a case where the air conditioner side controller unit 33 has succeeded in the authentication registration, that is, the authentication registration process in step S21 of FIG. 8. In such a case, as shown in FIG. 16, the information 92 indicating that the authentication registration has succeeded as a result of the authentication registration is displayed on the display unit 312.

Next, the air conditioner side controller unit 33 executes the authentication result transmission process in step S23 of FIG. 7, and transmits the authentication registration result to the operation terminal 60 that has transmitted the registration information. That is, when the authentication registration has failed, the air conditioner side controller unit 33 transmits information to the effect that the authentication registration has failed as a result of the authentication registration to the operation terminal 60. Further, when the authentication registration has succeeded, the air conditioner side controller unit 33 transmits information indicating that the authentication registration has succeeded as a result of the authentication registration to the operation terminal 60.

Next, the air conditioner side controller unit 33 executes the two-dimensional code invalidation process in step S24 to invalidate the currently issued two-dimensional code and erase the display of the two-dimensional code displayed on the display unit 312. This prevents the two-dimensional code already used for the authentication registration from being authenticated and registered for another operation terminal.

Figure 18:
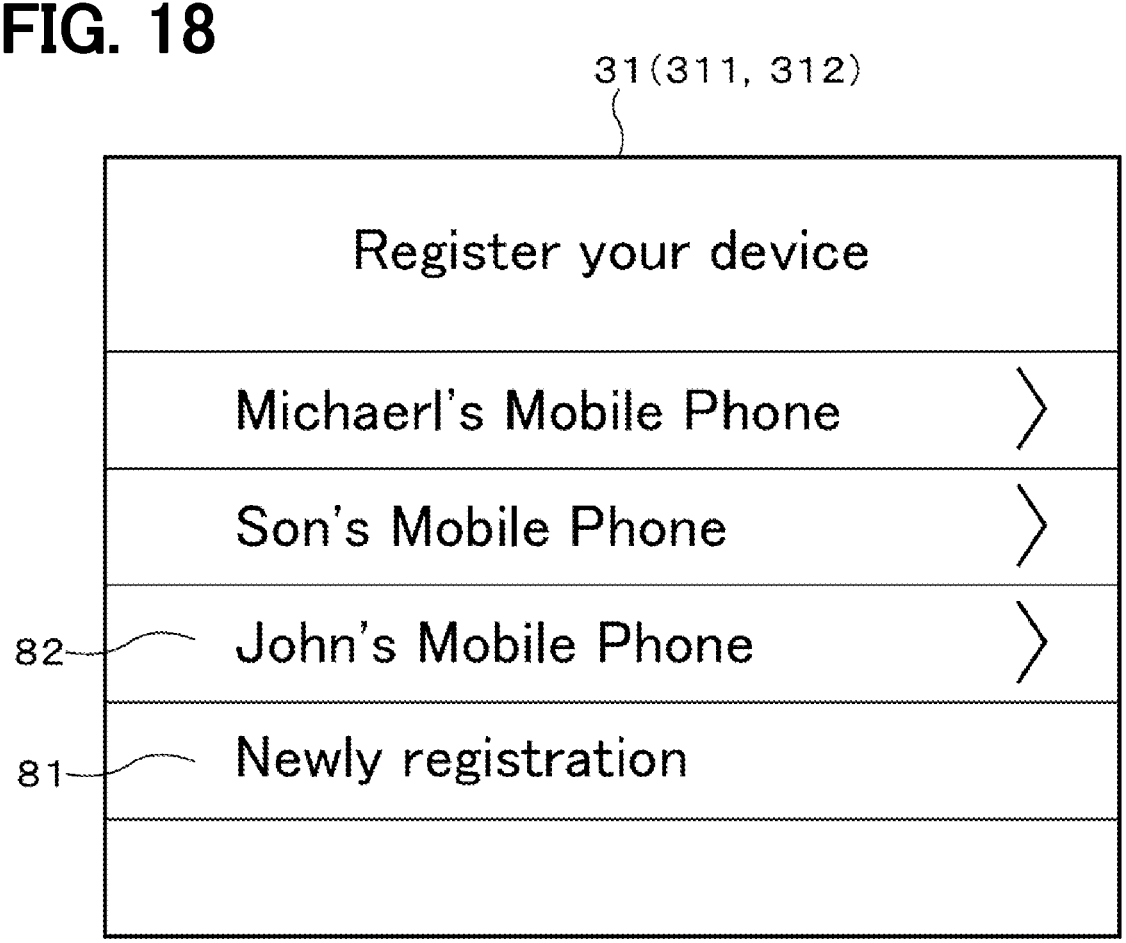
FIG. 18 is a diagram showing an example of a state in which a new operation terminal is additionally registered in a list of registered terminals by authentication of the operation terminal in the air conditioning control system according to the first embodiment.
Figure 19:
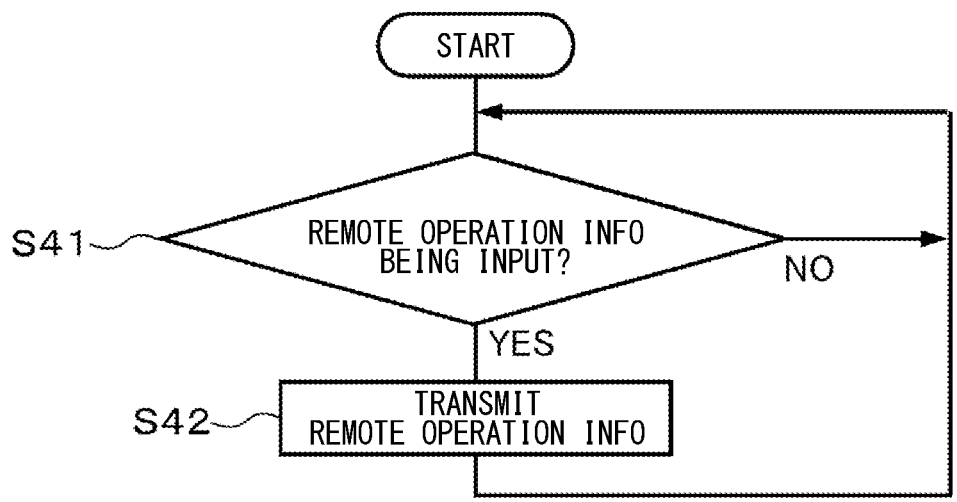
FIG. 19 is a flowchart showing an example of control executed by the operation terminal when performing remote operation using an authenticated operation terminal for the air conditioning control system according to the first embodiment.
Figure 20:
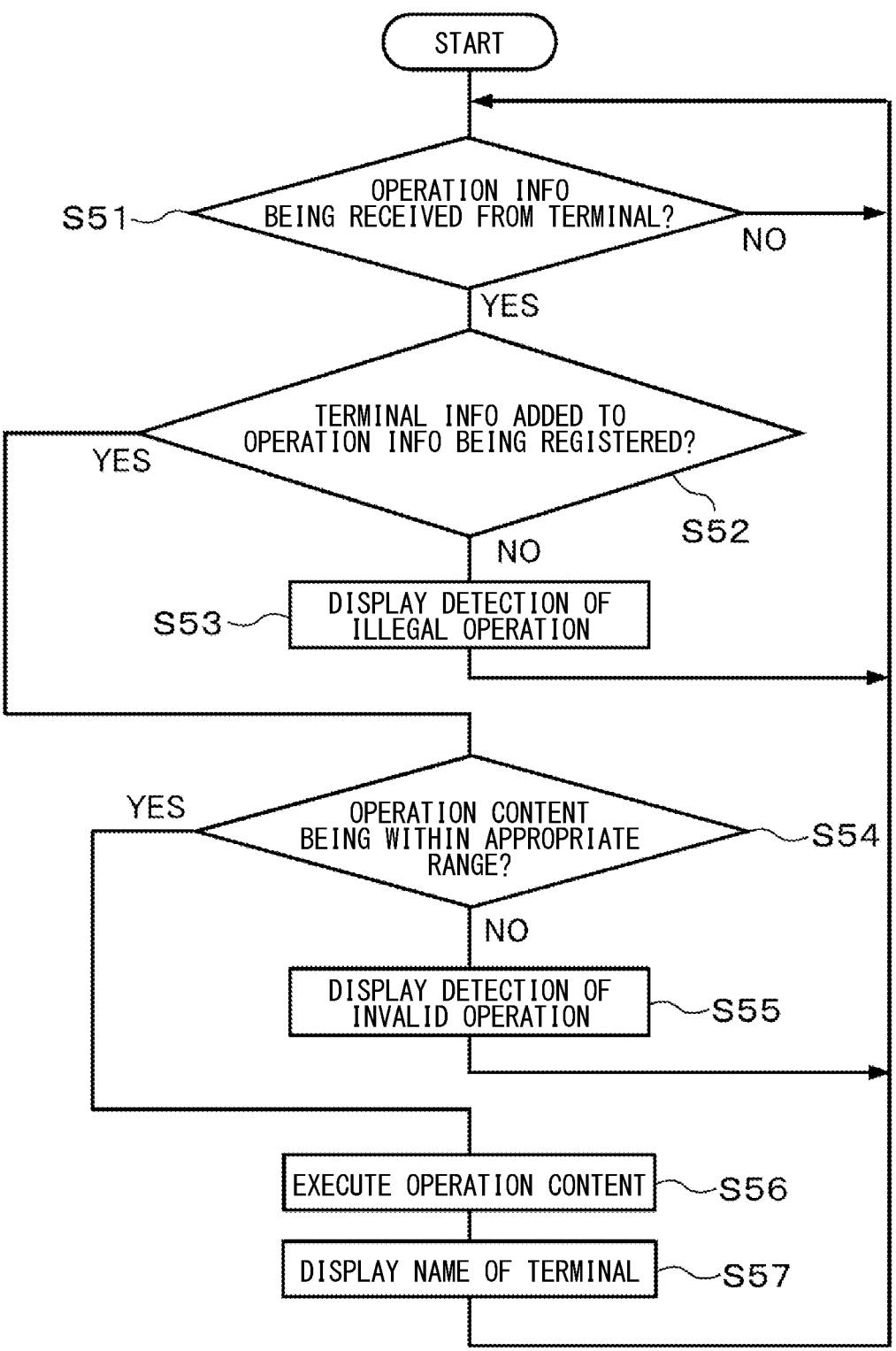
FIG. 20 is a flowchart showing an example of control executed by the air conditioning control device when performing remote operation using an authenticated operation terminal for the air conditioning control system according to the first embodiment.

Then, the air conditioner side controller unit 33 shifts the process to step S25, and displays a list of currently registered operation terminals, that is, a list of permitted terminals on the display unit 312. When the authentication registration has failed, the air conditioner side controller unit 33 displays the initial screen shown in FIG. 10, that is, the screen to which the terminal name of the new operation terminal 60 is not added, on the display unit 312. Further, when the authentication registration has succeeded, the air conditioner side controller unit 33 displays a screen on the display unit 312 to which the terminal name 82 of the new operation terminal 60 is added as shown in FIG. 18. Then, the air conditioner side controller unit 33 ends a series of processes related to the authentication registration of the operation terminal 60 (end of FIG. 7).

[Control Sequence of Operation Terminal]

Next, the control sequence executed by the operation terminal 60 regarding the authentication registration of the operation terminal 60 will be described. First, the user activates the application software installed on the operation terminal 60. In this case, although details are not shown, the operation terminal 60 accesses the server 50 when the application software is started on the operation terminal 60. Then, the server 50 requests the user to input the user ID and the password into the operation terminal 60 via the operation terminal 60. The server 50 stores the user ID in association with the password and the air conditioning control device 30. When the correct user ID and password are input to the operation terminal 60, the server 50 connects the operation terminal 60 and the air conditioning control device 30 associated with the user ID in a communicable manner. As a result, a series of controls for authenticating and registering the operation terminal 60 is started.

Figure 9:
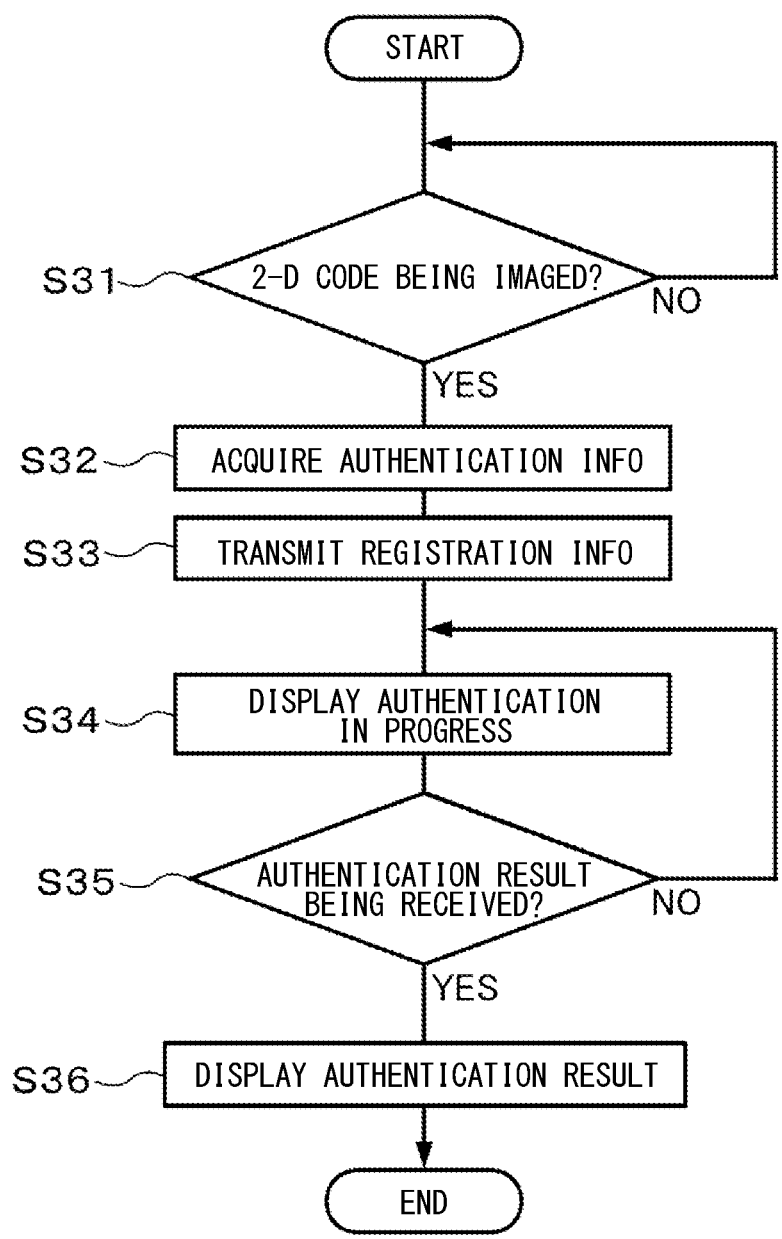
FIG. 9 is a flowchart showing an example of control executed by the operation terminal when the operation terminal is authenticated with respect to the air conditioning control system according to the first embodiment.

When a series of controls for authenticating and registering the operation terminal 60 is started, the operation terminal side controller unit 64 waits until the camera 63 of the operation terminal 60 images the two-dimensional code in step S31 of FIG. 9 (NO in step S31). When the two-dimensional code is imaged by the camera 63 (YES in step S31), the operation terminal side controller unit 64 shifts the process to step S32 and executes the authentication registration information acquisition process. As a result, the operation terminal side controller unit 64 decodes the two-dimensional code imaged by the camera 63 and acquires the authentication information included in the two-dimensional code.

Next, the operation terminal side controller unit 64 shifts the process to step S33 and executes the registration information transmission process. In step S33, the operation terminal side controller unit 64 transmits the registration information obtained by adding its own terminal information to the authentication information acquired from the two-dimensional code to the air conditioning control device 30 as shown in FIG. 5.

Figure 13:
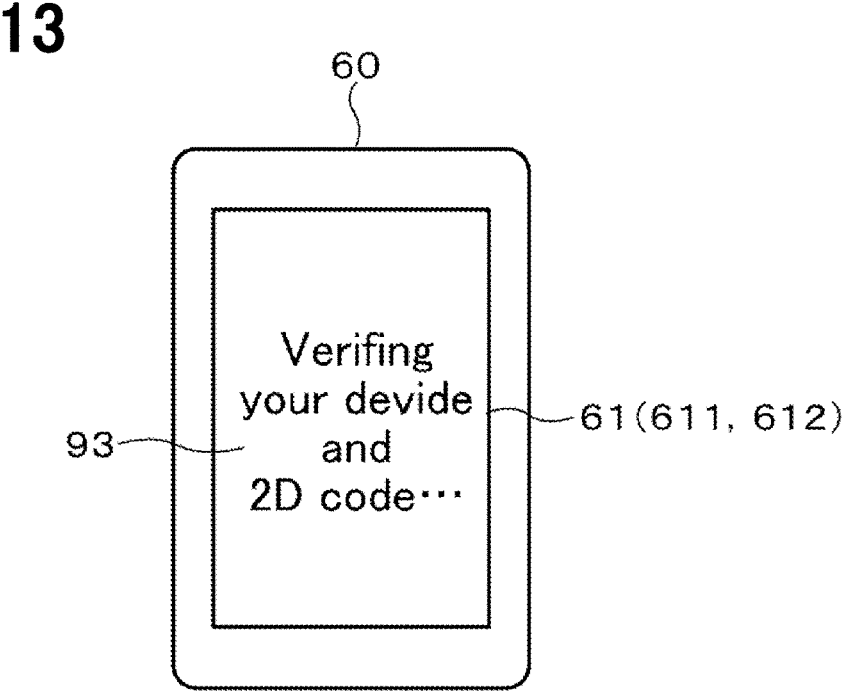
FIG. 13 is a diagram showing an example of a state in which information indicating that authentication is currently being performed is displayed on the display unit of the operation terminal when the operation terminal is authenticated with respect to the air conditioning control system according to the first embodiment.

Next, the operation terminal side controller unit 64 shifts the process to step S34, and as shown in FIG. 13, displays the information 93 indicating that performing authentication is in progress by the air conditioning control device 30 on the display unit 612 of the operation terminal 60. The information 93 indicating that performing authentication is in progress continues to be displayed on the display unit 612 until the result of the authentication registration is received from the air conditioning control device 30. Then, the operation terminal side controller unit 64 shifts the process to step S35 of FIG. 9, and repeats steps S34 and S35 until the result of authentication registration is received from the air conditioning control device 30 (NO in step S35).

When the operation terminal side controller unit 64 receives the authentication registration result from the air conditioning control device 30 (YES in step S35), the process is shifted to step S36 to execute the authentication result display process. At this time, when the operation terminal side controller unit 64 receives the fact that the authentication registration has failed, as shown in FIG. 15, the operation terminal side controller unit 64 displays the information 91, so-called error information 91, indicating that the authentication registration has failed as a result of the authentication registration on the display unit 612. Further, when the operation terminal side controller unit 64 receives the fact that the authentication registration has succeeded, the information 92 indicating that the authentication registration is successful as a result of the authentication registration is displayed on the display unit 612 as shown in FIG. 17. Then, the operation terminal side controller unit 64 ends a series of processes related to the authentication registration of the operation terminal 60 (end of FIG. 9).

[Remote Operation by Operating Terminal]

The remote operation of the air conditioning control device 30 using the authenticated and registered operation terminal 60 will be described with reference to FIGS. 19 to 23. The following will be described on the premise that (i) the main body of each process executed by the respective processing units 351 and 352 of the air conditioning control device 30 is the air conditioning control device side controller unit 33, and (ii) the main body of the processing executed by the processing unit 66 of the operation terminal 60 is the operation terminal side controller unit 64.

[Operation Terminal]

The operation terminal side controller unit 64 virtually realizes the remote operation information transmission processing unit 66 and the like shown in FIG. 3 by software by executing a program for performing remote operation in the CPU 641. That is, the remote operation information transmission processing unit 66 is realized by software, that is, by the CPU 641 executing the computer program stored in the non-transitory tangible storage medium such as the storage area 642 described above to execute the processing corresponding to the computer program. The remote operation information transmission processing unit 66 may be configured to be realized by hardware. For example, the remote operation information transmission processing unit 66 and the like may be realized in hardware as, for example, an integrated circuit integrated with the operation terminal side controller unit 64.

The remote operation information transmission processing unit 66 can execute the remote operation information transmission process. The remote operation information transmission process includes a process of transmitting the remote operation information for remotely controlling the air conditioning control device 30 by adding the terminal information of the own operation terminal 60, when the user inputs an operation related to the remote operation of the air conditioning control device 30 to the operation terminal 60. For example, suppose a case where the user inputs remote operation information such as raising the temperature, lowering the temperature, raising the humidity, and lowering the humidity in the house 1 to the operation terminal 60. In such a case, the operation terminal side controller unit 64 adds the terminal information shown in FIG. 6 to the remote operation information and transmits the remote operation information to the air conditioning control device 30.

[Air Conditioning Control Device]

The air conditioner side controller unit 33 virtually realizes the remote operation information determination processing unit 351 and the air conditioner control processing unit 352 shown in FIG. 2 by software, that is, by the CPU 331 executing a program for performing remote operation. That is, the remote operation information determination processing unit 351 and the air conditioner control processing unit 352 and the like are realized by software, that is, by the CPU 331 executing the computer program stored in the non-transitory tangible storage medium such as the storage area 332 described above to execute the processing corresponding to the computer program. In addition, at least a part of the remote operation information determination processing unit 351 and the air conditioner control processing unit 352 may be realized by hardware. For example, the remote operation information determination processing unit 351 and the air conditioner control processing unit 352 may be realized in hardware as, for example, an integrated circuit integrated with the air conditioning control device side controller unit 33.

The remote operation information determination processing unit 351 can execute the remote operation information determination process. The remote operation information determination process includes a process of determining whether the terminal information added to the remote operation information matches with the terminal information registered in the permitted terminal list by the authentication registration process, when remote operation information is received from the operation terminal 60. Then, the remote operation information determination process includes a process of determining that the received remote operation information is valid when both the terminal information match with each other, and determining that the received remote operation information is invalid when they do not match with each other.

Then, the air conditioner control processing unit 352 can execute the air conditioner control process. The air conditioner control process includes a process of controlling the air conditioner 20 based on the remote operation information determined to be valid by the remote operation information determination process. Further, the air conditioner control process may include a process of controlling the air conditioner 20 based on the operation content input to the operation panel 31 of the air conditioner control device 30.

[Control Sequence of Operation Terminal]

Next, the control sequence executed by the operation terminal 60 regarding the remote operation of the air conditioning control device 30 will be described. Here, the user first activates the software installed in the operation terminal 60 in the same manner as in authenticating and registering the operation terminal 60, and then inputs the user ID and password into the operation terminal 60 to establish communication with the air conditioning control device 30. As a result, the operation terminal side controller unit 64 starts the control sequence shown in FIG. 19.

The operation terminal side controller unit 64 waits until the user inputs remote operation information (NO in step S41). When the remote operation information is input from the user (YES in step S41), the operation terminal side controller unit 64 shifts the process to step S42 to execute the remote operation information transmission process, and transmits the remote operation information input from the user to the air conditioning control device 30. After that, the operation terminal side controller unit 64 returns the process to step S41, and repeats steps S41 and S42 until the remote operation is completed. [Control Sequence of Air Conditioning Control Device]

Next, the control sequence executed by the air conditioning control device 30 with respect to the remote operation of the air conditioning control device 30 will be described. The air conditioner side controller unit 33 displays the current temperature and the set temperature on the display unit 612, for example, as shown in FIG. 21 as an initial screen. Then, with the start of the control related to the remote operation (start of FIG. 20), first, in step S51, the air conditioner side controller unit 33 determines whether or not the remote operation information for performing the remote operation is received from the operation terminal 60, and waits until the operation information is received (NO in step S51). When receiving the remote operation information from the operation terminal 60 (YES in step S51), the air conditioner side controller unit 33 shifts the process to step S52 to execute the first stage of the remote operation information determination process.

The air conditioner side controller unit 33 acquires the terminal information added to the received remote operation information, in the remote operation information determination process in the first stage of step S52. Then, when the terminal information added to the received remote operation information is not registered in the permitted terminal list (NO in step S52), the air conditioner side controller unit 33 determines that the received remote operation information is invalid, and shifts the process to step S53. Then, in step S53, the air conditioner side controller unit 33 causes the display unit 312 to display the information 95 indicating that an illegal operation from an unpermitted operation terminal has been detected, for example, as shown in FIG. 22. After that, the air conditioner side controller unit 33 returns the process to step S51. In this case, the air conditioner side controller unit 33 rejects the invalid remote operation information and does not reflect the content of the remote operation information in the control of the air conditioner 20.

On the other hand, when the terminal information added to the received remote operation information is registered in the permitted terminal list (YES in step S52), the air conditioner side controller unit 33 shifts the process to step S54 to execute the second stage of the remote operation information determination process. In step S54, the air conditioner side controller unit 33 determines whether or not the received remote operation information is within an appropriate range. In this case, the appropriate range is, for example, within 15 degrees C. to 28 degrees C. for the set temperature and about 45% to 55% for the set humidity. This appropriate range is not limited to the above-mentioned numerical values, and may be set uniformly in advance or may be freely set by the user.

When the received remote operation information is out of the appropriate range (NO in step S54), the air conditioner side controller unit 33 determines that the received remote operation information is invalid, and shifts the process to step S55. Then, in step S55, the air conditioner side controller unit 33 causes the display unit 312 to display information indicating that the remote operation information is invalid because the remote operation information exceeds an appropriate range (although not shown). After that, the air conditioner side controller unit 33 returns the process to step S51.

Figure 23:
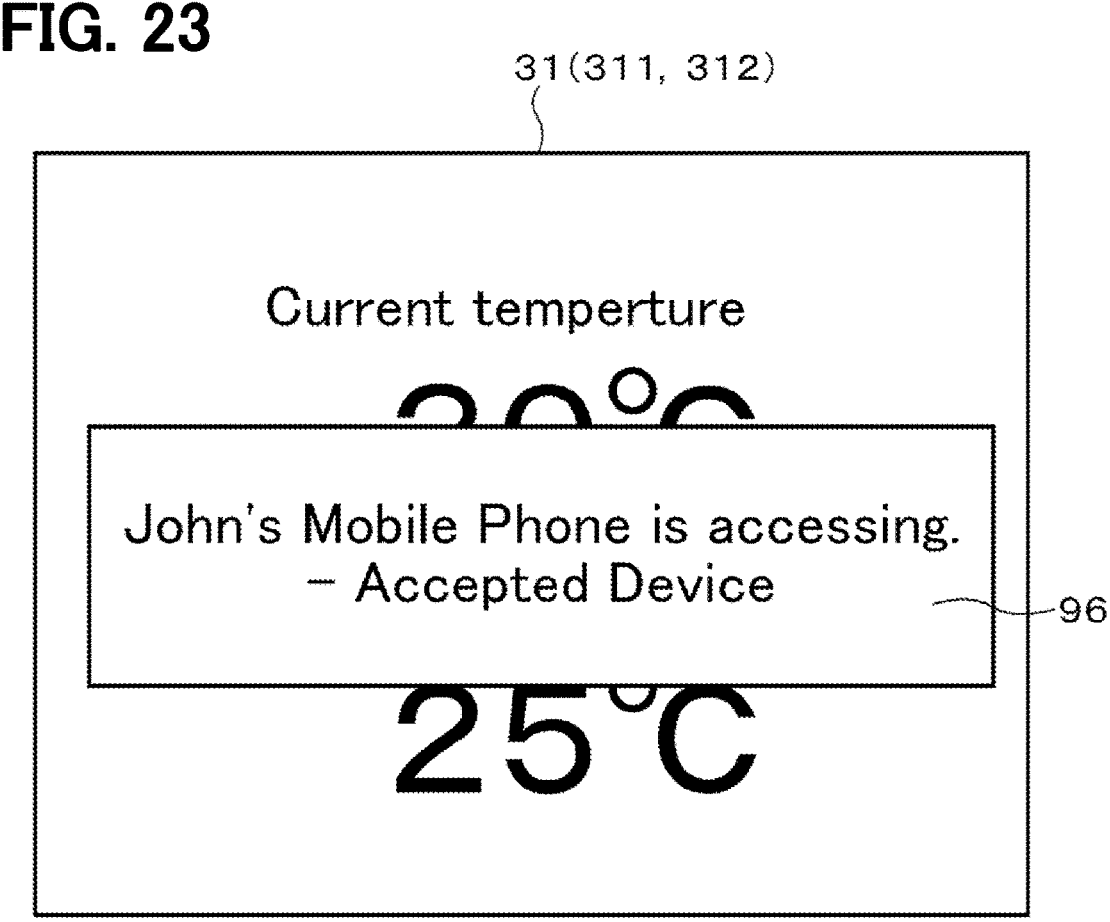
FIG. 23 is an example of display contents displayed on the display unit of the air conditioning control device when the remote operation information is valid in cases that remote operation is performed using the operation terminal for the air conditioning control system according to the first embodiment.

On the other hand, when the received remote operation information is within the appropriate range (YES in step S54), the air conditioner side controller unit 33 determines that the received remote operation information is valid, and shifts the process to step S56 to execute the air conditioner control process. Then, in step S57, the air conditioner side controller unit 33 causes the display unit 312 to display information 96 indicating that the remote operation is being executed, for example, as shown in FIG. 23. In this case, the information 96 indicating that the remote operation is being executed includes at least the terminal name of the operation terminal 60 that is performing the remote operation. After that, the air conditioner side controller unit 33 returns the process to step S51, and repeats steps S51 and subsequent steps until the remote operation is completed.

In the above configuration, among the processing units 341 to 347, 351, and 352 of the air conditioning control device 30, there are processing units that perform control unrelated to the issuance of the two-dimensional code or the control of the air conditioner 20. Such processing units include the collation processing unit 343, the authentication registration processing unit 344, the authentication result transmission processing unit 346, the two-dimensional code invalidation processing unit 347, and the remote operation information determination processing unit 351. Such processing units or functions thereof may be provided in the server 50.

According to the embodiment described above, the air conditioning control system 10 includes an air conditioner 20, an air conditioning control device 30, and an operation terminal 60. The air conditioning control device 30 has a function of controlling the air conditioner 20. The operation terminal 60 can be connected to the air conditioning control device 30 through a telecommunication line 70 such as the Internet, and is for remotely operating the air conditioner 20 via the air conditioning control device 30.

Further, the air conditioning control device 30 includes a display unit 312 capable of displaying information, an air conditioner side communicator unit 32, a two-dimensional code issuance processing unit 341, and a two-dimensional code display processing unit 342. The air conditioner side communicator unit 32 has a function of communicably connecting to the operation terminal 60 through the telecommunication line 70. The two-dimensional code issuance processing unit 341 can execute a two-dimensional code issuance process for issuing a two-dimensional code including authentication information unique to the air conditioning control device 30. The two-dimensional code display processing unit 342 can execute the two-dimensional code display process for displaying the two-dimensional code issued by the two-dimensional code issuance process, on the display unit 312.

The operation terminal 60 includes an operation terminal side communicator unit 62, a camera 63, an authentication information acquisition processing unit 651, and a registration information transmission processing unit 652. The operation terminal side communicator unit 62 has a function of communicably connecting to the air conditioning control device 30 through a telecommunication line 70 such as the Internet. The camera 63 can image the two-dimensional code displayed on the display unit 312 of the air conditioning control device 30, for example. The authentication information acquisition processing unit 651 can execute the authentication information acquisition process for acquiring the authentication information from the two-dimensional code imaged by the camera 63. The registration information transmission processing unit 652 can execute a registration information transmission process to transmit the registration information obtained by adding the terminal information including the information unique to the operation terminal to the authentication information acquired by the authentication information acquisition process to the air conditioning control device 30.

The air conditioning control device 30 further includes a collation processing unit 343 and an authentication registration processing unit 344. The collation processing unit 343 executes a collation process for collating the authentication information included in the two-dimensional code issued by the two-dimensional code issuance process with the authentication information included in the registration information transmitted from the operation terminal by the registration information transmission process. Then, suppose a case where (i) the authentication information included in the two-dimensional code issued by the two-dimensional code issuance process and (ii) the authentication information included in the registration information transmitted from the operation terminal by the registration information transmission process, match with each other. In such a case, the authentication registration processing unit 344 can execute the authentication registration process of authenticating and registering the operation terminal 60 having the terminal information included in the registration information as an operation terminal capable of remote operation of the air conditioning control device 30.

According to this, in order to remotely control the air conditioning control device 30 from the operation terminal 60, it is necessary to register the terminal information of the operation terminal 60 in the air conditioning control device 30 in advance. That is, the air conditioning control device 30 controls or rejects access to the operation terminal 60 for which the terminal information is not registered in advance. The user ID and password may be leaked to a third party, or the user ID and password entered by a third party may accidentally match their own. Even in such cases, if the terminal information of the operation terminal of the third party is not registered for authentication in the air conditioning control device 30, the third party cannot perform remote operation. As a result, the security risk due to leakage of the user ID and password, accidental duplication, etc. can be significantly reduced, and the security at the time of remote operation can be significantly improved.

Further, since the authentication information used for the authentication registration of the operation terminal 60 is displayed as a two-dimensional code on the display unit 312 of the air conditioning control device 30, it does not physically exist like a printed matter. Moreover, since the authentication information is displayed as a two-dimensional code, the contents cannot be understood only by a malicious third party looking at the two-dimensional code. Therefore, it is possible to effectively prevent the two-dimensional code, that is, the authentication information, from leaking to the outside of the house 1.

Further, in this case, in order for a malicious third party to acquire the registration information, it is necessary to invade the house 1 in which the air conditioning control device 30 is installed, find out the air conditioning control device 30, and capture an image. Therefore, there are many obstacles for a malicious third party to acquire the registration information, and therefore, it is possible to more effectively suppress the leakage of the two-dimensional code, that is, the authentication information, to the outside of the house 1. That is, according to this, the user who can perform the authentication registration of the operation terminal 60 can be limited to the person who can actually capture an image of the two-dimensional code. As a result, the risk that the authentication information leaks to the outside and the operation terminal is registered by a malicious third party can be reduced as much as possible. As described above, according to the present embodiment, authentication with a high security level can be performed. As a result, the user is freed from the anxiety that the air conditioning control device 30 of the house 1 is remotely controlled by a third party. At the same time, the air conditioning control device 30 in the house 1 can be remotely controlled with peace of mind.

The air conditioning control device 30 further includes a two-dimensional code invalidation processing unit 347. The two-dimensional code invalidation processing unit 347 can execute the two-dimensional code invalidation process. The two-dimensional code invalidation process includes a process of invalidating the two-dimensional code used in the authentication registration process when the terminal information is registered by the authentication registration process.

According to this, when the authentication of the operation terminal 60 is successful and the terminal information of the operation terminal 60 is registered, authentication registration cannot be further performed using the two-dimensional code used in the authentication. That is, the number (i.e., a counted number) of operation terminals that can be authenticated and registered with one two-dimensional code is limited to one. As a result, even if the image data of the two-dimensional code is passed on to a third party, it is possible to prevent unlimited authentication registration using the two-dimensional code. As a result, security risk can be reduced.

Further, the two-dimensional code invalidation process includes a process of invalidating the two-dimensional code when a predetermined period of time has elapsed since the two-dimensional code was displayed on the display unit 312. According to this, even if the image data of the two-dimensional code is passed to a third party, the two-dimensional code is invalidated after a predetermined period of time. Therefore, it is possible to prevent unlimited authentication registration using the two-dimensional code. As a result, security risk can be reduced.

The two-dimensional code invalidation process further includes a process of erasing the display or image of the two-dimensional code from the display unit when the two-dimensional code is invalidated. According to this, it is possible to prevent the user from accidentally using a two-dimensional code that has been invalidated and cannot be used for authentication registration. As a result, the convenience of the user can be improved.

The two-dimensional code issuance process includes a process of changing the content of the authentication information included in the two-dimensional code each time the two-dimensional code is issued. That is, the two-dimensional code becomes unique, that is, unique for each issuance. As a result, it is possible to prevent the authentication information issued by one air conditioning control device 30 from being duplicated with the authentication information issued by another air conditioning control device 30. As a result, it is possible to prevent the operation terminal 60 from being accidentally registered in another air conditioning control device 30 due to duplication of authentication information.

In addition, the authentication information includes unique information and variable information. The unique information is unique to the air conditioning control device 30, such as a serial number and MAC address. The variable information is such as the date and time of issuance, random numbers, etc., whose contents change randomly or according to the timing of issuance each time a two-dimensional code is issued. According to this, it is possible to prevent the authentication information issued by one air conditioning control device 30 from being duplicated with the authentication information issued by another air conditioning control device 30 with an extremely high probability. As a result, it is possible to extremely effectively prevent the operation terminal 60 from being accidentally registered in another air conditioning control device 30 due to duplication of authentication information.

Second Embodiment

Figure 25:
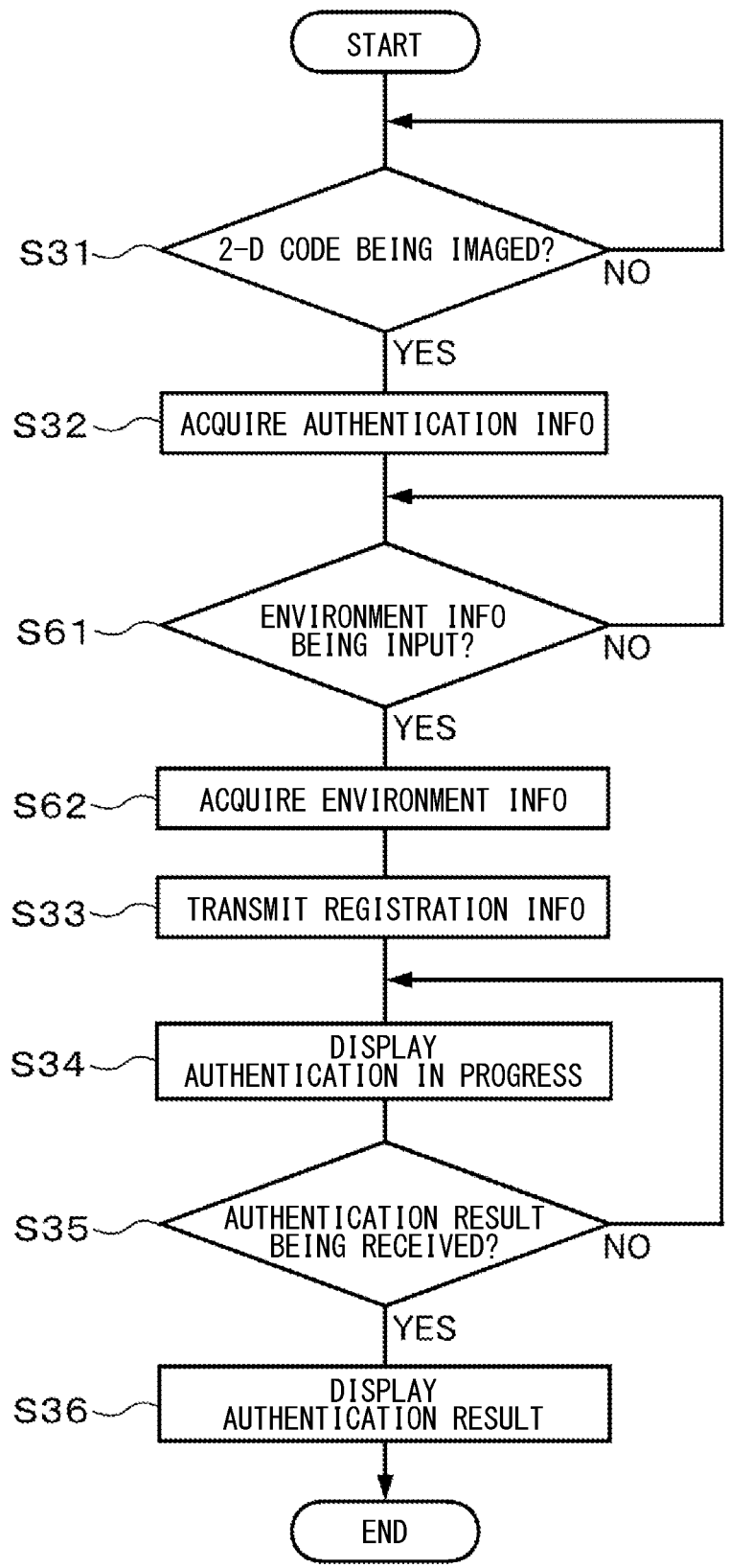
FIG. 25 is a flowchart showing an example of control executed by the operation terminal when the operation terminal is authenticated with respect to the air conditioning control system according to the second embodiment.
Figure 26:
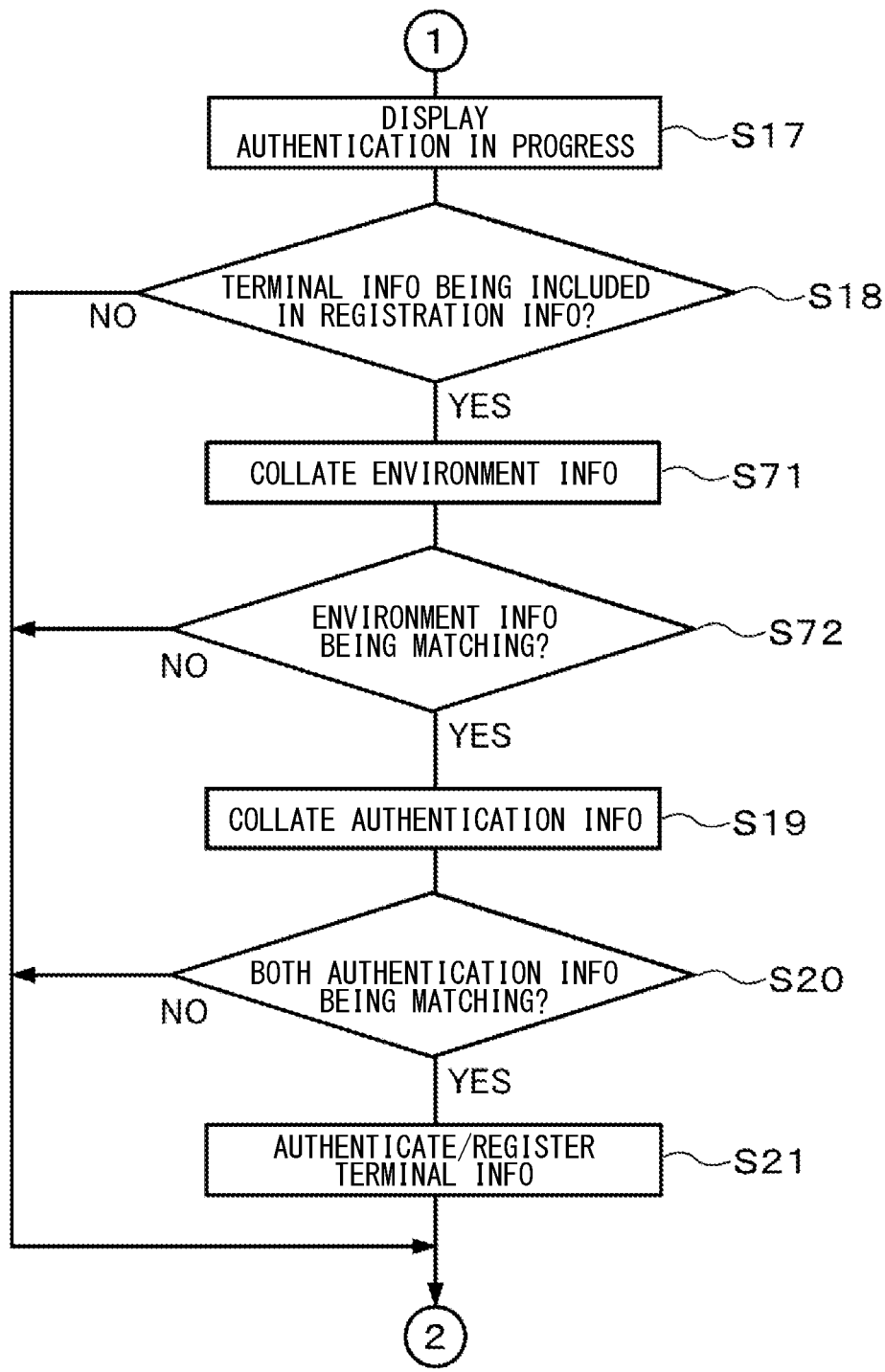
FIG. 26 is a flowchart showing an example of control executed by the air conditioning control device when authenticating an operation terminal for the air conditioning control system according to the second embodiment.

Next, a second embodiment will be described with reference to FIGS. 24 to 26. The present embodiment differs in that, in addition to the above configuration, environment information is further used in the collation process. In the present embodiment, the basic configurations of the air conditioner 20, the air conditioning control device 30, the access point 40, the server 50, the operation terminal 60, and the like are the same as those in the first embodiment. In the following description, step S62 in FIG. 25 is an environment information acquisition process, and steps S71 and S72 in FIG. 26 are collation processes. Further, step S33 in FIG. 25 is a registration information transmission process as in the first embodiment. Then, step S21 of FIG. 26 is an authentication registration process as in the first embodiment.

Figure 24:
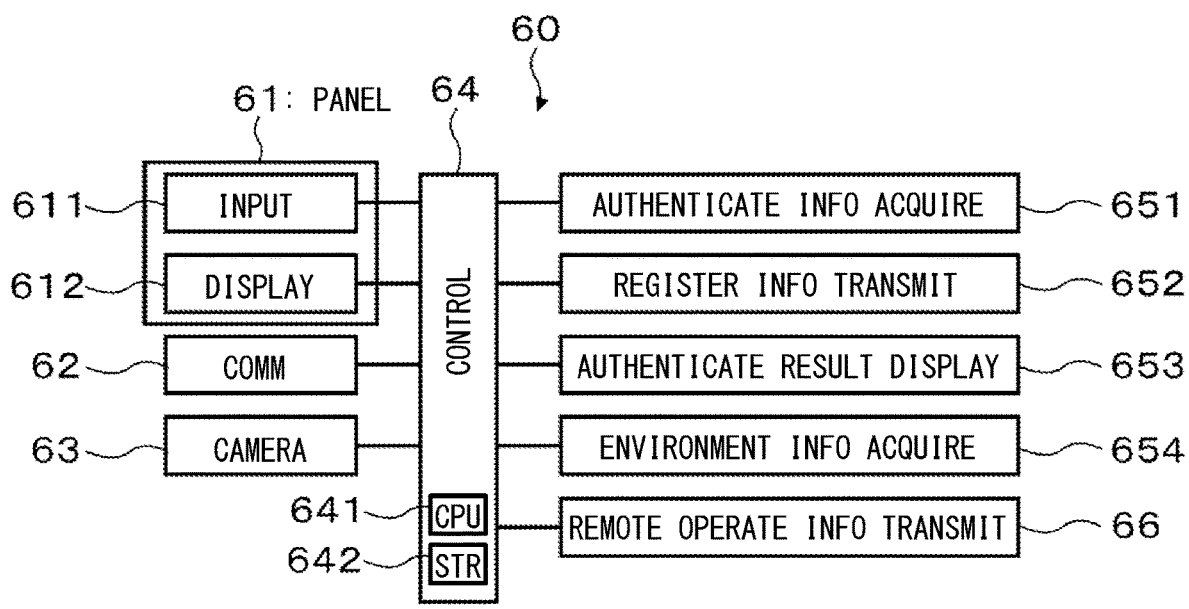
FIG. 24 is a block diagram showing an example of an electrical configuration of an operation terminal for the air conditioning control system according to a second embodiment.

In the present embodiment, as shown in FIG. 24, the operation terminal 60 further includes an environment information acquisition processing unit 654. The environment information acquisition processing unit 654 can execute the environment information acquisition process. The environment information acquisition process includes a process of acquiring environment information which is information on the current environment of the space in which the air conditioner 20 is installed. In the present embodiment, the environment information can determine the environment of the space in which the air conditioner 20 is set, and can be experienced by only the user located in the space. For example, the environment information includes information on temperature, humidity, air volume of air discharged from the air conditioner 20, and the like. The operation terminal 60 can acquire the environment information, for example, by the user inputting the environment information into the input unit 611 of the operation panel 61.

Further, in the present embodiment, the registration information transmission process further includes a process of transmitting the environment information to the air conditioning control device 30 together with the registration information. The collation process further includes a process of collating the environment information transmitted from the operation terminal 60 with the current environment information controlled by the air conditioning control device 30. Further, the authentication registration process includes a process of authenticating and registering the operation terminal 60 having the terminal information included in the registration information as an operation terminal capable of remote operation of the air conditioning control device in cases that the environment information transmitted from the operation terminal 60 and the current environment information controlled by the air conditioning control device 30 match with each other.

That is, in a series of controls for authenticating and registering the operation terminal 60, as shown in FIG. 25, the operation terminal side controller unit 64 images a two-dimensional code by the camera 63 capturing an image (YES in step S31). The authentication information included in the two-dimensional code is acquired (step S32). After that, in step S61, it is determined whether or not the environment information has been input to the input unit 611. In this case, the operation terminal 60 requests the user to input the environment information. Then, the user inputs, for example, the current environment information displayed on the display unit 612 of the air conditioning control device 30, that is, the temperature, humidity, or air volume, into the input unit 611 of the operation terminal 60. In this case, the operation terminal 60 may request the input of a plurality of environment information, or may request the input of only one environment information.

The operation terminal side controller unit 64 waits until the input unit 611 receives the input of the environment information (NO in step S61). Then, when the input unit 611 receives the environment information input (YES in step S61), the operation terminal side controller unit 64 acquires the environment information input to the input unit 611 in step S62. Then, in step S33, the operation terminal side controller unit 64 transmits the environment information acquired in step S62 together with the registration information to the air conditioning control device 30.

Further, in a series of controls for authenticating and registering the operation terminal 60, the air conditioner side controller unit 33 executes step S18 in FIG. 26. After that, in step S71, the environment information received from the operation terminal 60 is collated with either (i) the current environment condition measured by itself or (ii) the environment condition at the time of issuing the two-dimensional code. There is no big difference in time between the time when the air conditioning control device 30 issues the two-dimensional code and the time when the environment information is received from the operation terminal 60. There is thus no big change in the environment condition such as temperature and humidity. Therefore, the time when the air conditioning control device 30 issues the two-dimensional code and the time when the environment information is received from the operation terminal 60 can be almost the same.

Then, as a result of collating the environment information, there may be a case where the environment information received from the operation terminal 60 does not match the current environment condition at the time of issuing the two-dimensional code (NO in step S72). In this case, the air conditioner side controller unit 33 determines that an error has occurred, that is, that the authentication has failed, and shifts the process to step S22 of FIG. 7. On the other hand, there may be a case where the environment information received from the operation terminal 60 matches with the current environment condition at the time of issuing the two-dimensional code (YES in step S72). In this case, the air conditioner side controller unit 33 executes the processes after step S20.

According to this, the air conditioner side controller unit 33 collates not only the authentication information included in the two-dimensional code but also the environment information of the space in which the air conditioner 20 is set. The environment information is information that can only be known by a person in the space where the air conditioner 20 is set. According to this, even if the two-dimensional code, that is, the authentication information leaks to the outside of the house 1, the operation terminal cannot be authenticated and registered unless the environment information matches. Therefore, even if the authentication information is leaked to the outside, the risk that the operation terminal is registered by a malicious third party can be further reduced. As a result, authentication with a higher security level can be performed.

Other Embodiments

The present disclosure is not limited to the embodiments that have been described above and illustrated in the drawings, but can freely be modified, combined, or expanded without departing from the gist of the present disclosure. The numerical values and the like shown in the embodiments described above are examples, and are not limited to those examples. Moreover, each embodiment may be combined. Further, the above-mentioned authentication method and authentication program between the air conditioning control device 30 and the operation terminal 60 can also be applied to authentication between the operation terminal 60 and a device other than the air conditioning control device 30.

The present disclosure has been described in accordance with the embodiment. However, it is to be understood that the present disclosure is not limited to the embodiment and structure. The present disclosure also encompasses various modifications and variations within an equivalent range. In addition, various combinations and forms, and further, other combinations and forms including only one element, or more or less than these elements are also within the spirit and the scope of the present disclosure.

For reference to further explain features of the present disclosure, the description is added as follows.

There is known an air conditioning control system that can remotely control an air conditioner at home from outside via the Internet. Air conditioning is a major factor in determining the comfort of the indoor environment. Therefore, for example, if the temperature and humidity are set differently from the user's intention by a malicious third party, the indoor environment becomes extremely unpleasant for the user. Therefore, in an air conditioning control system capable of remote operation, it is necessary to appropriately prevent unauthorized remote operation by a third party.

Generally, in such an air conditioning control system, a user ID and a password are set in order to prevent unauthorized remote operation. In this case, the user ID is used to associate with the air conditioning control system. Further, the password is used to authenticate whether or not the user is a legitimate user of the air conditioning control system associated with the user ID.

The user inputs the user ID and password when performing remote operation. Then, the air conditioning control system authenticates whether or not the user is a legitimate user who is permitted to perform remote operation based on the user ID and password input by the user. According to this, the user only has to input two data, a user ID and a password, in order to obtain permission for remote operation, and therefore, remote operation can be performed relatively easily.

However, while such a configuration can improve the convenience of the user, the problem of security risk has become apparent. For example, when authentication is performed using two data (i.e., a user ID and a password), if the user ID and password are leaked to a malicious third party, it leads to an illegal operation of the air conditioner. Further, such a system can generally exclude duplicate user IDs, that is, the same user ID used by a plurality of different users. However, it is often permissible for a single password to be duplicated for different user IDs. In this case, if the user ID and password are simple, for example, if one user mistakenly inputs the user ID, there is a high possibility that the password accidentally matches that of another user. Thus, if the user erroneously inputs the user ID and password, the user intends to remotely control the air conditioner at home, but unintentionally remotely controls the air conditioner at another person's house.

It is thus desired to provide an air conditioning control system and a storage medium storing an authentication program product, which are capable of improving security when performing remote operation.

An aspect of the present disclosure described herein is set forth in the following clauses.

According to an aspect of the present disclosure, an air conditioning control system is provided to include an air conditioner, an air conditioning control device configured to control the air conditioner, and an operation terminal communicably connected to the air conditioning control device via a telecommunication line, the operation terminal remotely controlling the air conditioner via the air conditioning control device.

The air conditioning control device includes a display configured to display information, an air conditioner side communicator communicably connected to the operation terminal through the telecommunication line, a two-dimensional code issuance processing unit configured to execute a two-dimensional code issuance process that issues a two-dimensional code including authentication information unique to the air conditioning control device, and a two-dimensional code display processing unit configured to execute a two-dimensional code display process that displays the two-dimensional code on the display.

The operation terminal includes an operation terminal side communicator communicably connected to the air conditioning control device via the telecommunication line, a camera configured to image the two-dimensional code, an authentication information acquisition processing unit configured to execute an authentication information acquisition process that acquires the authentication information from the two-dimensional code imaged by the camera, and a registration information transmission processing unit configured to execute a registration information transmission process that transmits registration information to the air conditioning control device, the registration information being obtained by adding terminal information including information unique to the operation terminal to the authentication information acquired by the authentication information acquisition process.

The air conditioning control device further includes a collation processing unit configured to execute a collation process that collates the authentication information included in the two-dimensional code issued by the two-dimensional code issuance process with the authentication information included in the registration information transmitted from the operation terminal by the registration information transmission process, and an authentication registration processing unit configured to execute an authentication registration process that authenticates and registers the operation terminal having the terminal information included in the registration information as an operation terminal enabled to perform a remote operation of the air conditioning control device in response to the authentication information included in the two-dimensional code issued by the two-dimensional code issuance process matching with the authentication information included in the registration information transmitted from the operation terminal by the registration information transmission process.

According to the above configuration, in order to remotely control the air conditioning control device from the operation terminal, it is necessary to register the terminal information of the operation terminal in the air conditioning control device in advance. That is, the air conditioning control device controls or rejects an access by the operation terminal whose terminal information is not registered in advance. Suppose a case where the user ID and password are leaked to a third party, or the user ID and password entered by a third party accidentally match their own. Even in such a case, if the terminal information of the operation terminal of the third party is not registered for authentication in the air conditioning control device, the third party cannot perform remote operation. As a result, the security risk due to leakage of the user ID and password, accidental duplication, etc. can be significantly reduced; the security at the time of remote operation can be significantly improved.

Further, the authentication information used for the authentication registration of the operation terminal is displayed as a two-dimensional code on the display unit of the air conditioning control device; thus, it does not physically exist like a printed matter. Moreover, the authentication information is displayed as a two-dimensional code; thus, the contents cannot be understood by a malicious third party just looking at the two-dimensional code. Therefore, it is possible to effectively prevent the two-dimensional code, that is, the authentication information, from leaking to the outside of the house.

Further, in this case, in order for a malicious third party to acquire the registration information, it is necessary to invade the house where the air conditioning control device is installed, find the air conditioning control device, and take a picture. Thus, there are many obstacles for a malicious third party to acquire the registration information. It is therefore possible to more effectively suppress the leakage of the two-dimensional code (i.e., the authentication information) to the outside of the house. That is, according to this, the user who can perform the authentication registration of the operation terminal can be limited to the person who can actually take an image of the two-dimensional code. As a result, the risk that the authentication information leaks to the outside and the operation terminal is registered by a malicious third party can be reduced as much as possible. As described above, according to the present embodiment, authentication with a high security level can be performed. As a result, the user can be freed from the anxiety of remotely controlling the air conditioning control device in the house from a third party, and can remotely control the air conditioning control device in the house with peace of mind.

What is claimed is:

1. An air conditioning control system comprising:
an air conditioner;
an air conditioning control device configured to control the air conditioner; and
an operation terminal communicably connected to the air conditioning control device via a telecommunication line, the operation terminal remotely controlling the air conditioner via the air conditioning control device,
the air conditioning control device comprising:
a display configured to display information;
an air conditioner side communicator communicably connected to the operation terminal through the telecommunication line;
a two-dimensional code issuance processing unit configured to execute a two-dimensional code issuance process that issues a two-dimensional code including authentication information unique to the air conditioning control device; and
a two-dimensional code display processing unit configured to execute a two-dimensional code display process that displays the two-dimensional code on the display,
the operation terminal comprising:
an operation terminal side communicator communicably connected to the air conditioning control device via the telecommunication line;
a camera configured to image the two-dimensional code;
an authentication information acquisition processing unit configured to execute an authentication information acquisition process that acquires the authentication information from the two-dimensional code imaged by the camera; and
a registration information transmission processing unit configured to execute a registration information transmission process that transmits registration information to the air conditioning control device, the registration information being obtained by adding terminal information including information unique to the operation terminal to the authentication information acquired by the authentication information acquisition process,
the air conditioning control device further comprising:
a collation processing unit configured to execute a collation process that collates the authentication information included in the two-dimensional code issued by the two-dimensional code issuance process with the authentication information included in the registration information transmitted from the operation terminal by the registration information transmission process; and
an authentication registration processing unit configured to execute an authentication registration process that authenticates and registers the operation terminal having the terminal information included in the registration information as an operation terminal enabled to perform a remote operation of the air conditioning control device in response to the authentication information included in the two-dimensional code issued by the two-dimensional code issuance process matching with the authentication information included in the registration information transmitted from the operation terminal by the registration information transmission process.

2. The air conditioning control system according to claim 1, wherein:
the air conditioning control device further comprises a two-dimensional code invalidation processing unit configured to execute a two-dimensional code invalidation process that invalidates the two-dimensional code used in the authentication registration process in response to the terminal information being registered by the authentication registration process.

3. The air conditioning control system according to claim 2, wherein:
the two-dimensional code invalidation process further includes a process that erases the two-dimensional code displayed on the display in response to the two-dimensional code being invalidated.

4. The air conditioning control system according to claim 2, wherein:
the two-dimensional code issuance process includes a process that varies a content of the authentication information included in the two-dimensional code each time the two-dimensional code is issued.

5. The air conditioning control system according to claim 1, wherein:
the air conditioning control device further comprises a two-dimensional code invalidation processing unit configured to execute a two-dimensional code invalidation process that invalidates the two-dimensional code in response to a predetermined period of time having elapsed since the two-dimensional code was displayed on the display.

6. The air conditioning control system according to claim 1, wherein:
the authentication information includes (i) unique information unique to the air conditioning control device and (ii) variable information whose content varies randomly or according to a time of issuance each time the two-dimensional code is issued.

7. The air conditioning control system according to claim 1, wherein:
the operation terminal further comprises an environment information acquisition processing unit configured to execute an environment information acquisition process that acquires environment information which is information on a current environment of a space in which the air conditioner is installed;
the registration information transmission process further includes a process that transmits the environment information to the air conditioning control device together with the registration information;
the collation process further includes a process that collates the environment information transmitted from the operation terminal with current environment information controlled by the air conditioning control device; and
the authentication registration process further includes a process that authenticates and registers the operation terminal having the terminal information included in the registration information as the operation terminal enabled to perform the remote operation of the air conditioning control device in response to the environment information transmitted from the operation terminal matching with the current environment information controlled by the air conditioning control device.

8. The air conditioning control system according to claim 1, wherein:
the operation terminal further comprises:
a remote operation information transmission processing unit configured to execute a remote operation information transmission process that transmits (i) remote operation information to perform the remote operation of the air conditioning control device and (ii) the terminal information of the operation terminal itself added to the remote operation information,
the air conditioning control device further comprises:
a remote operation information determination processing unit configured
to determine that the remote operation information is valid in response to the remote operation information being received and the terminal information added to the remote operation information matching with the terminal information registered by the authentication registration process, and
to determine that the remote operation information is invalid in response to the remote operation information being received and the terminal information added to the remote operation information failing to match with the terminal information registered by the authentication registration process, and an air conditioner control processing unit configured to execute an air conditioner control process that controls the air conditioner based on the remote operation information determined to be valid by the remote operation information determination process.

9. The air conditioning control system according to claim 1, wherein:
the air conditioning control device further comprises a first controller configured to implement (i) the two-dimensional code issuance processing unit, (ii) the two-dimensional code display processing unit, (iii) the collation processing unit, and (iv) the authentication registration processing unit; and
the operation terminal further comprises a second controller configured to implement (i) the authentication information acquisition processing unit and (ii) the registration information transmission processing unit.

10. A non-transitory computer readable storage medium storing a computer program product comprising first instructions and second instructions,
the first instructions being configured to, when executed by at least one first processor, cause the first processor to:
execute a two-dimensional code issuance process of issuing a two-dimensional code including authentication information unique to an air conditioning control device controlling an air conditioner in a house; and
execute a two-dimensional code display process of displaying the two-dimensional code on a display in the air conditioning control device,
the second instructions being configured to, when executed by at least one second processor, cause the second processor to:
execute an authentication information acquisition process of acquiring the authentication information from the two-dimensional code imaged by a camera in an operation terminal communicably connected with the air conditioning control device via a telecommunication line; and
execute a registration information transmission process of transmitting registration information obtained by adding terminal information unique to the operation terminal to the authentication information acquired by the authentication information acquisition process to the air conditioning control device via the telecommunication line,
the first instructions being further configured to, when executed by the first processor, cause the first processor to:
execute a collation process of collating the authentication information included in the two-dimensional code issued by the two-dimensional code issuance process with the authentication information included in the registration information transmitted from the operation terminal by the registration information transmission process; and
execute an authentication registration process of authenticating and registering the operation terminal having the terminal information included in the registration information as an operation terminal enabled to perform a remote operation of the air conditioning control device in response to the authentication information included in the two-dimensional code issued by the two-dimensional code issuance process matching with the authentication information included in the registration information transmitted from the operation terminal by the registration information transmission process.

11. An air conditioning control system comprising:

an air conditioner;

an air conditioning control device configured to control the air conditioner; and an operation terminal communicably connected to the air conditioning control device via a telecommunication line, the operation terminal remotely controlling the air conditioner via the air conditioning control device, the air conditioning control device comprising:

a display configured to display information;

a first transceiver communicably connected to the operation terminal through the telecommunication line; and a first controller communicably connected with the display and the first transceiver, the first controller being configured to
issue a two-dimensional code including authentication information unique to the air conditioning control device, and
display the two-dimensional code on the display, the operation terminal comprising:

a second transceiver communicator communicably connected to the air conditioning control device via the telecommunication line;

a camera configured to image the two-dimensional code; and a second controller communicably connected with the second transceiver and the camera, the second controller configured to
acquire the authentication information from the two-dimensional code imaged by the camera; and
transmit registration information to the air conditioning control device, the registration information being obtained by adding terminal information including information unique to the operation terminal to the authentication information, wherein:

the first controller in the air conditioning control device is further configured to
collate the authentication information included in the two-dimensional code with the authentication information included in the registration information transmitted from the operation terminal, and
authenticate and register the operation terminal having the terminal information included in the registration information as an operation terminal enabled to perform a remote operation of the air conditioning control device in response to the authentication information included in the two-dimensional code matching with the authentication information included in the registration information transmitted from the operation terminal.

* * * * *